United States Patent [19]

Hayashi et al.

[11] Patent Number: 4,935,809
[45] Date of Patent: Jun. 19, 1990

[54] COLOR FILM ANALYZING METHOD AND APPARATUS

[75] Inventors: Ryoichi Hayashi, Tokyo; Kiichiro Sakamoto, Kanagawa; Yoshiaki Sakamoto; Yutaka Sugiura, both of Tokyo, all of Japan

[73] Assignee: Fuji Photo Film Co., Ltd., Kanagawa, Japan

[21] Appl. No.: 294,713

[22] Filed: Jan. 9, 1989

[30] Foreign Application Priority Data

| Jan. 8, 1988 | [JP] | Japan | 63-2034 |
| Feb. 3, 1988 | [JP] | Japan | 63-22989 |
| Feb. 3, 1988 | [JP] | Japan | 63-22990 |
| Feb. 3, 1988 | [JP] | Japan | 63-22991 |
| Feb. 3, 1988 | [JP] | Japan | 63-22992 |
| Feb. 5, 1988 | [JP] | Japan | 63-25116 |
| Mar. 4, 1988 | [JP] | Japan | 63-51201 |

[51] Int. Cl.$^5$ ............................................. G03F 3/10
[52] U.S. Cl. ........................................ 358/76; 358/75; 358/77; 340/721; 355/38
[58] Field of Search ................ 358/75, 76, 77, 80, 358/22, 183; 355/38; 340/721, 731

[56] References Cited

U.S. PATENT DOCUMENTS

| 4,279,502 | 7/1981 | Thurm et al. | |
| 4,364,084 | 12/1982 | Akimoto et al. | |
| 4,366,475 | 12/1982 | Kishi et al. | 340/731 |
| 4,531,150 | 7/1985 | Amano | |
| 4,561,768 | 12/1985 | Fürsich et al. | 355/38 |
| 4,608,596 | 8/1986 | Williams et al. | |
| 4,642,700 | 2/1987 | Ohta et al. | 358/488 |
| 4,644,339 | 2/1987 | Ruder | 340/731 |
| 4,689,669 | 8/1987 | Hoshino et al. | 358/76 |
| 4,691,229 | 9/1987 | Colditz et al. | 358/78 |
| 4,698,664 | 10/1987 | Nichols et al. | 358/22 |
| 4,716,404 | 12/1987 | Tabata et al. | 340/721 |
| 4,746,981 | 5/1988 | Nadan et al. | 358/22 |
| 4,751,502 | 6/1988 | Ishii et al. | 340/706 |
| 4,751,507 | 6/1988 | Hama et al. | 340/731 |
| 4,769,640 | 9/1988 | Sato | 340/731 |
| 4,779,987 | 10/1988 | Umemoto et al. | 355/38 |
| 4,782,384 | 11/1988 | Tucker et al. | 358/22 |
| 4,782,390 | 11/1988 | Hayashi et al. | 358/76 |
| 4,800,376 | 1/1989 | Suga et al. | 340/752 |
| 4,802,019 | 1/1989 | Harada et al. | 358/183 |
| 4,808,987 | 2/1989 | Takeda et al. | 340/731 |
| 4,823,303 | 4/1989 | Terasawa | 340/721 |
| 4,835,526 | 5/1989 | Ishii et al. | 340/709 |

FOREIGN PATENT DOCUMENTS

| 0108158 | 4/1982 | European Pat. Off. | |
| 0177857 | 4/1986 | European Pat. Off. | |
| 2705097 | 8/1978 | Fed. Rep. of Germany | |
| 0207238 | 12/1982 | Japan | 358/76 |
| 62-141530 | 6/1987 | Japan | |
| 1540525 | 2/1979 | United Kingdom | |
| 2191655 | 12/1987 | United Kingdom | |

Primary Examiner—Howard W. Britton
Assistant Examiner—Kim Yen Vu
Attorney, Agent, or Firm—Sughrue, Mion, Zinn, Macpeak & Seas

[57] ABSTRACT

A color film analyzing method and apparatus which displays image data of frames of the film as positive images provided by a TV camera, and a plurality of reference images previously provided and stored in a recording member, in a matrix pattern on an image display device. When one of the color images of the picture frames is specified, the image line of the matrix including the specified image is shifted so that the specified image is adjacent to the reference image line on the image display device and a cursor image is displayed overlapping a portion of the specified image. The cursor image is provided as a reversed image of the part of the specified image where the specified image is overlapped by the cursor image. If the reversed image has a color identical or similar to the portion of the specified image surrounding the cursor image, the cursor image is colored differently. Any images, when specified, may be magnified and displayed at the center of the image display device, and the remaining images may be eliminated.

35 Claims, 14 Drawing Sheets

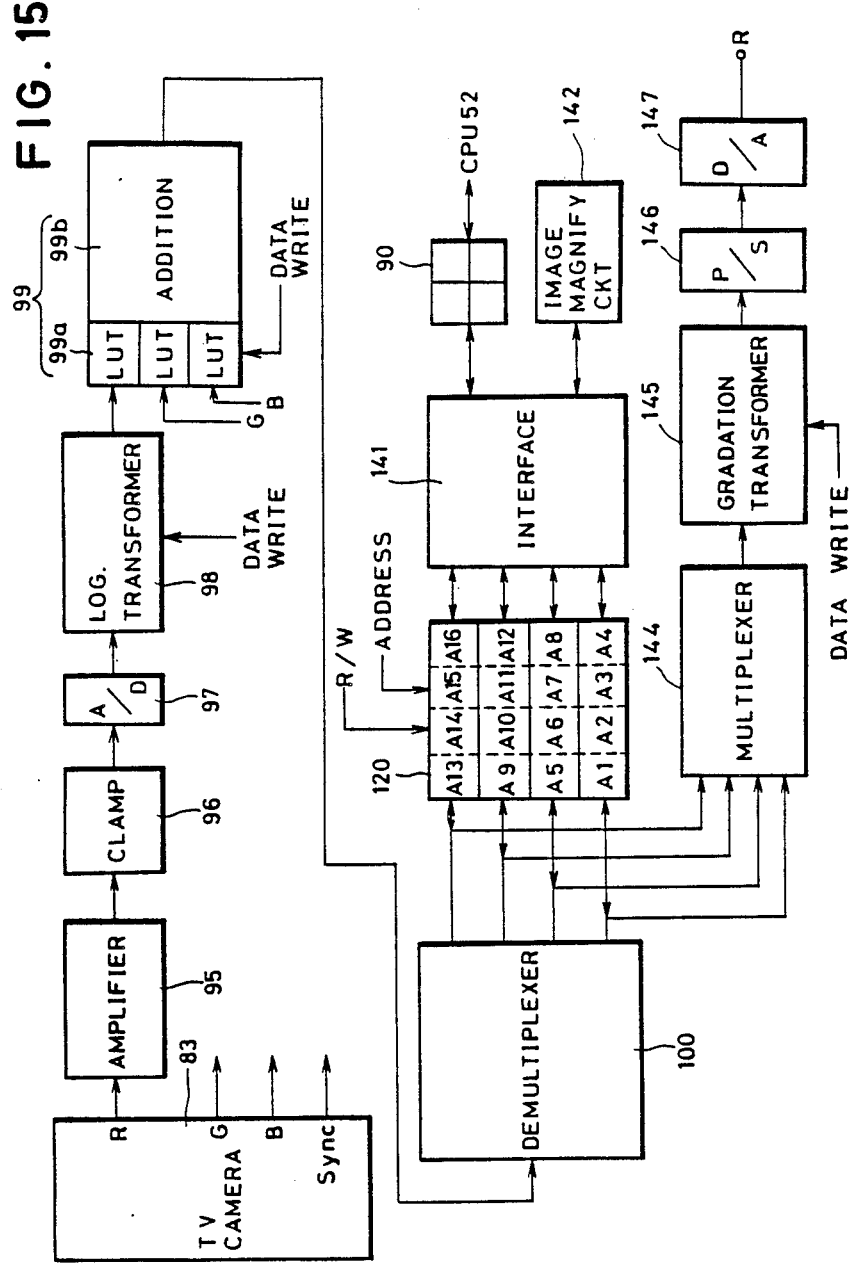

COLOR FILM ANALYZING METHOD AND APPARATUS

BACKGROUND OF THE INVENTION

The present invention relates to a method and apparatus for analyzing and inspecting color films.

Video type color film analyzers are well known in the art. One example disclosed in Japanese Unexamined Patent Publication No. 62-141,530 uses a color TV camera to provide color image data corresponding to picture frames of a number of rolls of color film which have been spliced together. The color image data of the respective picture frames are stored in a memory, and after being read out the data is gradation transformed based on its large area transmittance density (LATD), and transformed from negative form to positive form. The transformed data is then sent to one of a plurality of CRT displays, arranged in a line, to display a simulated color image thereon. A color film analyzer of this type can display a plurality of simulated color images on the line of CRT displays. The center CRT display displays a color image which is to be inspected and/or corrected. The remaining CRT displays on one side of the center CRT display, show color images which have been previously inspected, and corrected are if needed. On the opposite side of the center CRT display, color images which are yet to be inspected are displayed. Therefore, the simulated color image on the center, CRT display can be estimated by comparing with its adjacent corrected and uncorrected color images.

In another color film analyzer disclosed in U.S. Pat. No. 4,364,084, the simulated color images and the color images which are yet to be simulated are displayed in a matrix pattern. If any of the displayed color images has undesirable color and/or density as a printed image, it is specified via a light pen, or the like, to correct the exposure. Image data of the specified image is gradation transformed according to the corrected exposure so that color and/or density of the color image is correctly changed.

The image data of picture frames to be displayed are written in and read out from an image memory as is disclosed in, for example, European Unexamined Publication No. 108,158 corresponding to U.S. Pat. No. 4,531,150.

Such video-type color film analyzers have various drawbacks. Because a roll of color film often includes frames bearing unintended principal subject images, blurred images or the like, these frames usually need not be printed. It is difficult to specify an image or images which should not be printed based upon visual inspection using these color film analyzers. It is therefore often necessary to repeatedly specify picture frames which need not be printed.

It is also difficult to determine whether each simulated image has proper color balance and/or density.

In the above examples, a plurality of simulated images or images which are yet to be simulated are displayed on a single display device such as a CRT, and as a result each image is too small and unsuitable for visual inspection.

A cursor, usually used in the computer art, is a gray or white square image. If such a cursor is used for specifying an image or the principal part thereof which has colors that are identical or similar to the color of the cursor, it will be hard to distinguish the cursor from the specified image.

A different problem of the conventional video-type color film analyzers is how to specify the number of prints for each picture frame to be printed. Since the specified number of prints cannot be displayed on any part of the analyzer, it is impossible to confirm the specified number of prints at any desired time. Furthermore, if all of the picture frames to be printed require the same number of prints, the same number must be specified for each picture frame. This is quite troublesome inspection work.

OBJECT OF THE INVENTION

It is, therefore, an object of the present invention to provide a video type color film analyzing method and apparatus in which the color balance and/or density of simulated color images are easily evaluated.

It is another object of the present invention to provide a video-type color film analyzing method and apparatus in which a specifying mark is displayed so as to overlap a specified image and is significantly visually recognizable.

It is still another object of the present invention to provide a video-type color film analyzing method and apparatus in which a specified image is magnified when displayed.

It is a further object of the present invention to provide a video-type color film analyzing method and apparatus in which a number of prints can be specified not only individually for respective picture frames to be printed, but also commonly to all of the picture frames to be printed.

It is a still further object of the present invention to provide a video-type color film analyzing method and apparatus in which a number of prints individual to a specified picture frame can be specified in place of the number of prints specified as being common to all of the picture frames to be printed if both of the numbers are applicable to the specified picture frame.

It is a yet further object of the present invention to provide a method of displaying a cursor or mark which is easily recognized.

SUMMARY OF THE INVENTION

The above and other objects of the present invention can be achieved by providing a method and apparatus for displaying color images of a plurality of picture frames and a plurality of standard reference images having proper color and density in a matrix pattern on a color image display device.

Image data of the standard reference images and the color images of the plurality of picture frames to be displayed on the color display device are stored in a memory. The memory is divided into a plurality of memory blocks corresponding to columns or lines of the matrix image pattern, so as separately to store the image data of the reference images and the images of picture frames. The reference images are recorded in a magnetic floppy disk and read out every time color films are analyzed.

In analyzing or inspecting a color film, the standard reference images having proper density and color balance are displayed in an image matrix. Image data of a plurality of picture frames are provided by a color TV camera one by one, and are displayed in a plurality of columns or lines of the image matrix. The displayed image of each picture frame is compared with the standard reference images displayed in a line or a column on the display device. If an image is evaluated as being too poor for printing, the image is specified so that correction data may be entered. If any one of the images displayed on the image display device is specified, the column or line of the image matrix where the specified image is located is shifted so that it is adjacent to the column or line of the standard reference images. Thus, it is easy to compare the specified image with the standard reference images.

According to a preferred embodiment of the present invention, when specifying any one of the images of a plurality of picture frames displayed in a matrix on the image display device a mark or cursor is displayed overlapping the specified image. The mark or cursor is preferably colored differently from the color of the part of the specified image where the mark or cursor overlaps.

This differently colored mark or cursor is used to indicate that the image is being inspected or evaluated or that the specified image is unfavorable to print.

According to another preferred embodiment of the present invention, when specifying any one of the images of a plurality of picture frames, the specified image is magnified and displayed at the center of the screen of the image display, device and the remaining images are simultaneously erased from the screen.

According to still another preferred embodiment of the present invention, when one of the images of a plurality of picture frames displayed on the image display device is specified and then data for the number of prints to be made from the specified image picture frame is entered, the number is displayed overlapping the specified image. If a section formed between two spliced films is specified and then the number of prints to be made is entered, the number is displayed on an image of the spliced section and the number of prints is available for all of the picture frames to be printed.

BRIEF DESCRIPTION OF THE DRAWINGS

The following description refers to the accompanying drawings in which like reference characters refer to like parts throughout the several drawings, and wherein:

FIG. 15 is a block diagram showing another embodiment of an image signal processing section;

DETAILED DESCRIPTION OF THE INVENTION

Figure 1:
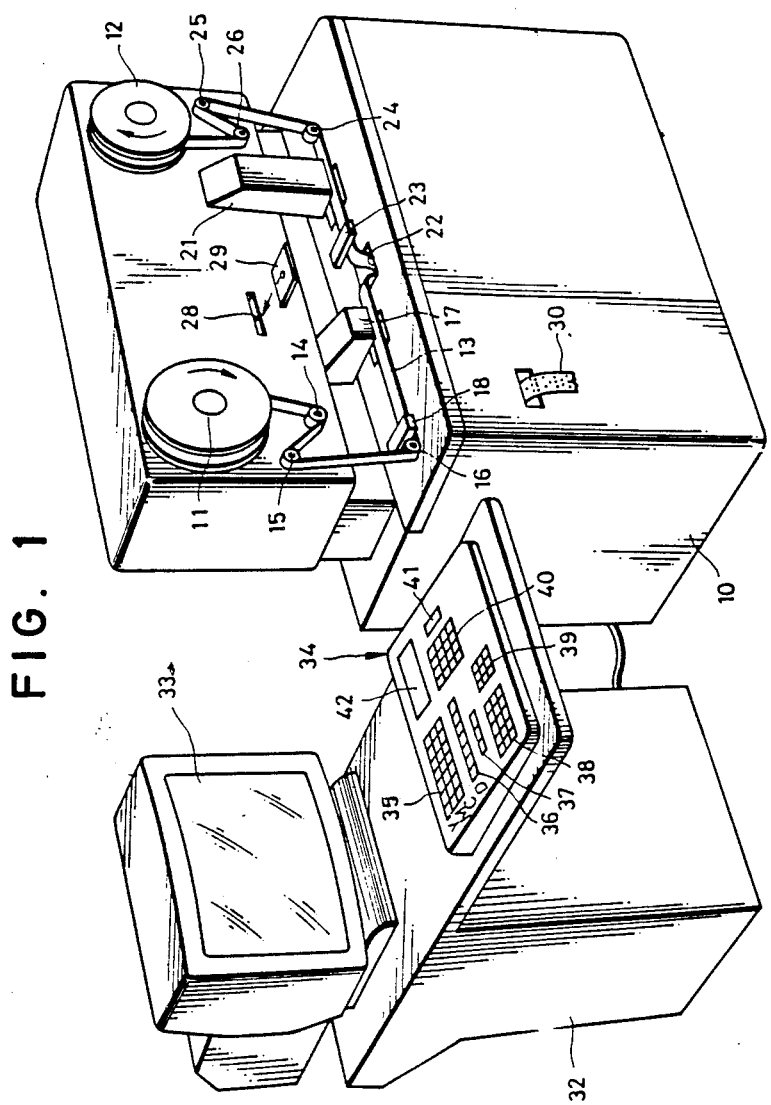
FIG. 1 is a perspective view showing a color film analyzer embodying the present invention.
Figure 2:
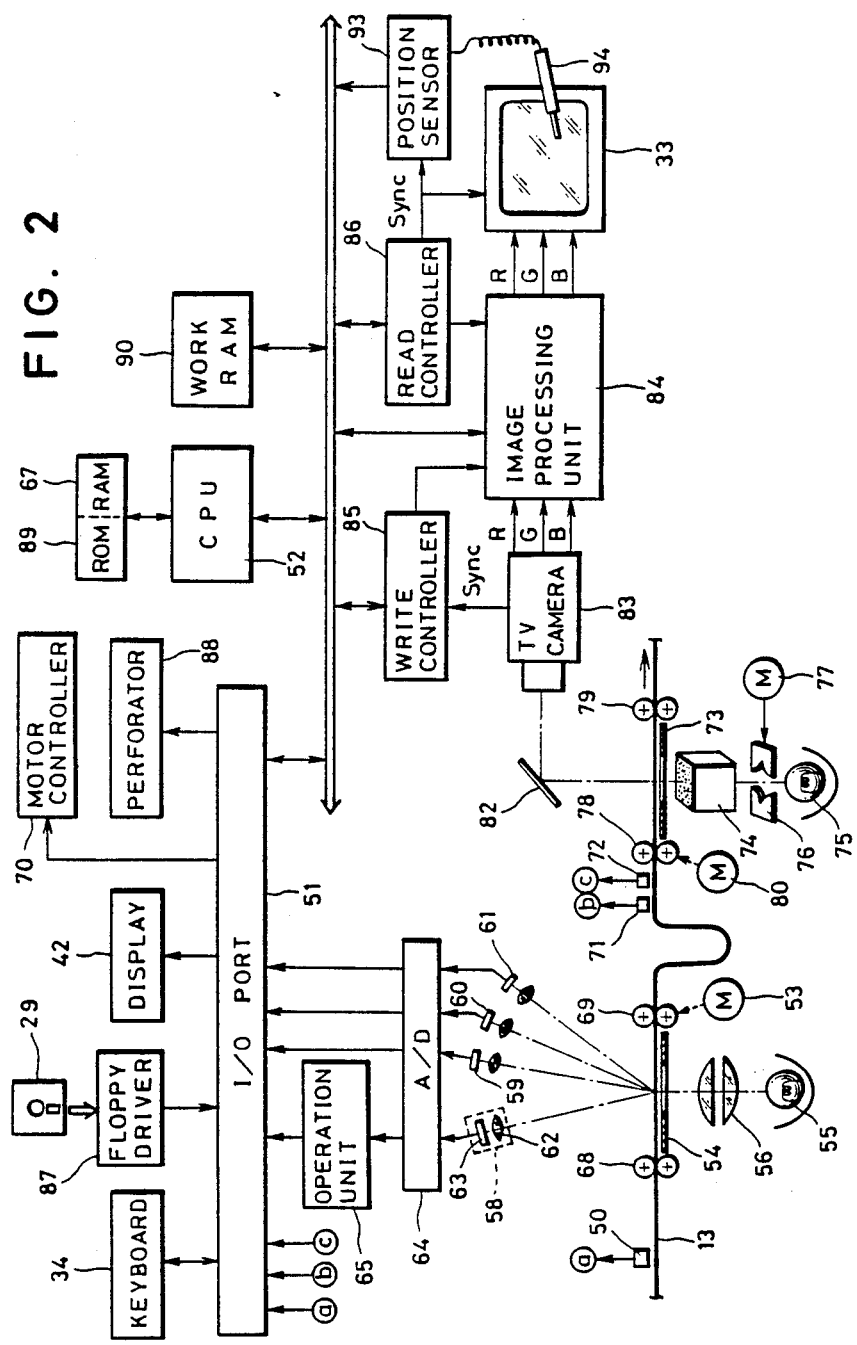
FIG. 2 is a block diagram showing the color analyzer of FIG. 1.

Referring now to the drawings, in particular FIGS. 1 and 2, a color film analyzer is shown having a color film analyzer unit 10 and an operation unit 32. The color film analyzer unit 10 includes film supply and film take-up reels 11 and 12 detachably mounted thereon. A film 13 consisting of a number of rolls of color negative film spliced together is wound in a roll about the film supply reel 11. The spliced color film 13 is withdrawn from the film supply reel 11, by means of a drive roller 16 and guide rollers 14 and 15, to position picture frames thereof at a measuring station. Above the measuring station, there is a sensor unit 58 for measuring each picture frame located at the measuring station which is surrounded by a hood 17. Between the feed roller 16 and the measuring station there is a notch sensor 50 supported by an arm 18 for detecting notches 113 (see FIG. 6) formed in association with picture frames to be printed.

The spliced color film 13 is further transported to an image pick-up station where a mirror 82 surrounded by a hood 21 is disposed. At the image pick-up station, an image of a picture frame is reflected by the mirror 82 and picked up by a color TV camera 83. In order to position each picture frame separately and independently at the measuring and image pick-up stations, a utility space 22 is provided, where the analyzed part of the spliced color film 13 is stored in a loop. Between the utility space 22 and the hood 21 there is an arm 23 supporting a spliced section sensor for detecting spliced sections of the color film 13, and a notch sensor 71 for detecting the notches 113, shown in FIG. 6. After proceeding through the image pick-up station, the spliced color film 13 is further transported by a drive roller 24 and guide rollers 25 and 26 and wound up around the take-up reel 12.

A floppy disk loading slot 28 is provided through which a magnetic floppy disk 29 with image data of a standard reference image(s) recorded thereon is loaded. A tape perforator 88 is incorporated in the color film analyzer unit 10 to punch a paper tape 30 to form a printing data code in the paper tape after the analysis of the spliced color film 13. The printing data includes data common to all the picture frames of the spliced film 13 and individual data peculiar to an individual picture frame of the spliced film 13. Such common data preferably includes data concerning the type of film, film size (full size or half size), the common number of prints to be made from the respective picture frames, etc. On the other hand, the individual data includes data concerning exposure correction, the number of prints to be made from the picture frame, data indicating that a print is unnecessary, etc.

The operation unit 32 includes a color monitor 33 with a large size screen 33a and a keyboard 34. This color monitor 33, which displays color images of picture frames of the spliced film 13 to be analyzed on the screen 33a, may be a color CRT or a liquid crystal panel. The keyboard 34 has various alphanumeric keys 38, color keys 35, density keys 36, correction keys 37, operation keys 39, picture frame specifying keys 40, a page change key 41, and a display screen 42. The color keys 35 include correction keys for cyan, magenta, and yellow. For each color, a plurality of correction keys are provided to correct the color in a stepwise manner. The density keys 36 are arranged in a single line for correcting the density in a stepwise fashion. The alphanumeric keys 38 are used to enter data concerning the printing conditions, the number of prints to be made, film type, and film size. The operation keys 39 include various keys for starting the analysis of a color film, printing out the entered correction data, designating display modes, or the like. The picture frame specifying keys 40 comprise 16 keys corresponding to 16 picture frames, and are used to designate or specify one of the images displayed on the screen 33a prior to the entry of data pertaining to the specified image. The page change key 41 is used quickly to replace an image frame including a plurality of color images displayed on the screen 33a with another image frame. The display screen 42 displays the data entered.

Figure 5:
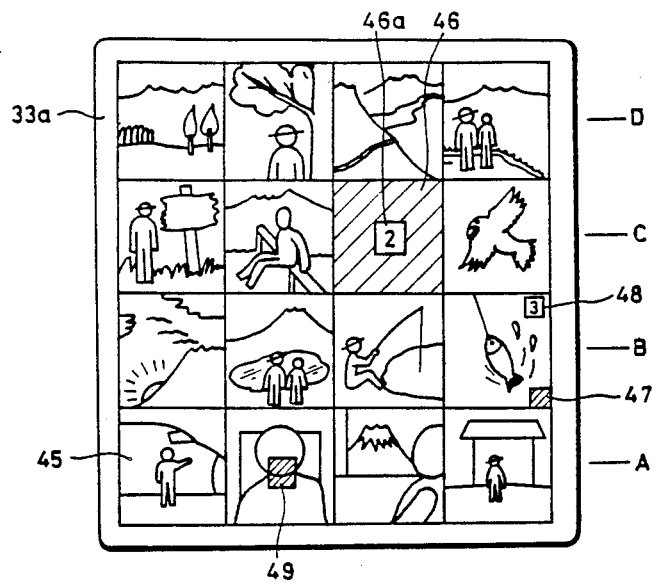
FIG. 5 is an illustration of a screen of a color image display device.

The color monitor 33 can display images for a plurality of picture frames of the spliced film 13 in various display modes. For example, the image frame can be displayed in a sixteen-division display mode or twelve-division display mode, or even in single-division display mode. Any desired display mode can be selected via the operation keys 39 before inputting image data for the picture frames of the spliced film 13 via the color TV camera 83. When displaying the images of picture frames of the spliced film 13 in the sixteen-division display mode, the screen 33a is, as is shown in FIG. 5, divided into four lines (A, B, C, and D), each line having four divisions, resulting in sixteen total divisions. Positive color images 45 of sixteen picture frames are displayed, one in each division of the screen 33a. It is noted that the images of the respective division lines A-D are arranged in the order the images are inputted through the color TV camera 83. That is, the images in the division line A are inputted prior to those of the division line B, and accordingly the images in line D are inputted last. It is also noted that a left-hand image is inputted prior to a right-hand image adjacent thereto in each line. If the twelve-division display mode is designated, four standard reference images having standard colors and densities are read out from the magnetic floppy disk 29 and displayed in line D while images of twelve picture frames inputted through the color TV camera 83 are displayed in the lower three lines A-C of the screen 33a. If the single-division display mode is designated, an image of a single picture frame is magnified four times or more as large as a usually displayed image size and displayed with at least the central four divisions of the screen 33a.

As was previously noted and shown in FIG. 2, the color film analyzer includes the notch sensor 50 supported by the arm 18 which detects a notch 113 formed in association with a picture frame to be printed. When the sensor 50 detects a notch 113, it provides an appropriate notch signal which in turn is sent to a central processing unit (CPU) 52 through an I/O port 51. Since the distance between the notch sensor 50 and the measuring station is a known value, a picture frame with a notch 113 can be positioned at the measuring station by advancing the spliced film 13 that known distance, after the detection of the associated notch 113. To effect such film advancement a pulse motor 53 is used and driven by a controlled number of drive pulses.

A film framing mask or carrier 54 is disposed so as to place each picture frame of the film 13 in position at the measuring station. The picture frame located in the film framing mask 54 is illuminated with the light emitted from a lamp 55 which is passed through a condenser lens assembly 56. After passing through the picture frame in the film framing mask 54, the light is focussed and measured by a scanner unit 58 and respective color sensors 59, 60, and 61 for red, green, and blue, all of which are surrounded by the hood 17. The scanner unit 58 includes a focusing lens 62 and an image area sensor 63 to convert photoelectrically light passed through respective pixels of the picture frame into time-serial image signals. After being converted into digital image signals by an A/D converter 64, the time serial signals are sent to an operation unit 65 comprising an eight-bit microcomputer, and are converted into logarithmic signals which are used as density signals. The density signals thus obtained are stored in a memory. Then, the density signals for pixels within a previously specified area of the picture frame are read out to calculate an arithmetical mean density of the specified area of the picture frame. In such a manner as described above, arithmetical mean densities are calculated for a central area, and upper and lower half areas excepting the central area, respectively. Based on a distribution of the densities for these areas of the picture frame, a density pattern is determined and an appropriate exposure calculation formula is selected to calculate an appropriate exposure correction value. The correction value thus calculated is stored in a RAM 67.

The color sensors 59 to 61 for red, green, and blue measure large area transmittance densities (LATDs) for each picture frame of the spliced film 13 placed in position on the film framing mask 54 to provide appropriate electric signals (LATD signals). After being converted into digital signals in A/D converter 64, these LATD signals are sent to the CPU 52 through the I/O port 51. Based on the LATD signals, a correction value and a transmittance rate of an ND filter are calculated for each color in the CPU 52, and are stored in the RAM 67.

On opposite sides of the film framing mask 54 there are two pairs of rollers 68 and 69 driven by a pulse motor 53. A motor controller 70 controls the rotation of the pulse motor 53 to advance and place the film 13 in position.

After measurement, the spliced film 13 is again transported, passing through the utility space 22 toward the image pick-up station. Before the image pick-up station there is disposed a notch sensor 71 and a spliced section sensor 72 supported by the arm 23. The notch sensor 71 detects notches 113 to provide an electric notch signal which in turn is sent to the CPU 52 through the I/O port 51 and used in the placement of picture frames as was previously noted. The spliced section sensor 72 detects spliced sections between two rolls of films to provide spliced-line signals, which are also sent to the CPU 52 through the I/O port 51. When a notch signal is received, the CPU 52 provides image data so that a blank image 46, as shown in FIG. 5, is displayed to indicate that a spliced section is located between the picture frames whose images are displayed on the divisions before and after the blank image.

At the image pick-up station there is a film framing mask 73 for accurately placing picture frames in position. An image frame on the film framing mask 73 is illuminated with the light emitted from a lamp 75 passing through a mixing box 74 and an ND filter assembly 76. The ND filter assembly 76 has two ND filters which are controllably moved in opposite directions in a plane perpendicular to the optical path by a pulse motor 77. Specifically, the ND filters are moved away from each other and displaced from the optical path for excessively overexposed picture frames, or close to each other and placed in the optical path for excessively under-exposed picture frames. A determination is made as to whether each picture frame at the measuring station is properly exposed, over-exposed, or under-exposed.

On both sides of the film framing mask 73 there are two pairs of rollers 78 and 79 driven by a pulse motor 80. The motor controller 70 controls the rotation of the pulse motor 80 to advance and place picture frames in position at the image pick-up station. An image of each picture frame placed at the image pick-up station is reflected by the mirror 82, surrounded by the hood 21, and directed to the color TV camera 83 built in the analyzer unit 10. The color TV camera 83 picks up the image and provides color image signals R, G, and B for red, green, and blue, and synchronizing signals Sync. These color signals R, G, and B are sent to the color monitor 33, after being subjected to image processing in an image processing unit 84. A write controller 85 generates address signals based on the synchronizing signals Sync and controls the writing of data in the image processing unit 84 with the address signals. A read controller 86 is controlled by the CPU 52 to generate address signals for reading out data from the image processing unit 84 and to generate synchronizing signals to be sent to the color monitor 33.

A floppy disk drive 87 reads out image data of the standard reference images and writes them in the image processing unit 84. The perforator 88 is actuated upon the completion of the analysis operation so as to punch the paper tape 30 forming punched codes concerning the common and individual printing data. In the ROM 89, various data are stored, such as fixed printing data, operation program data, and the like. RAM 90 is used to back up image data.

Figure 3:
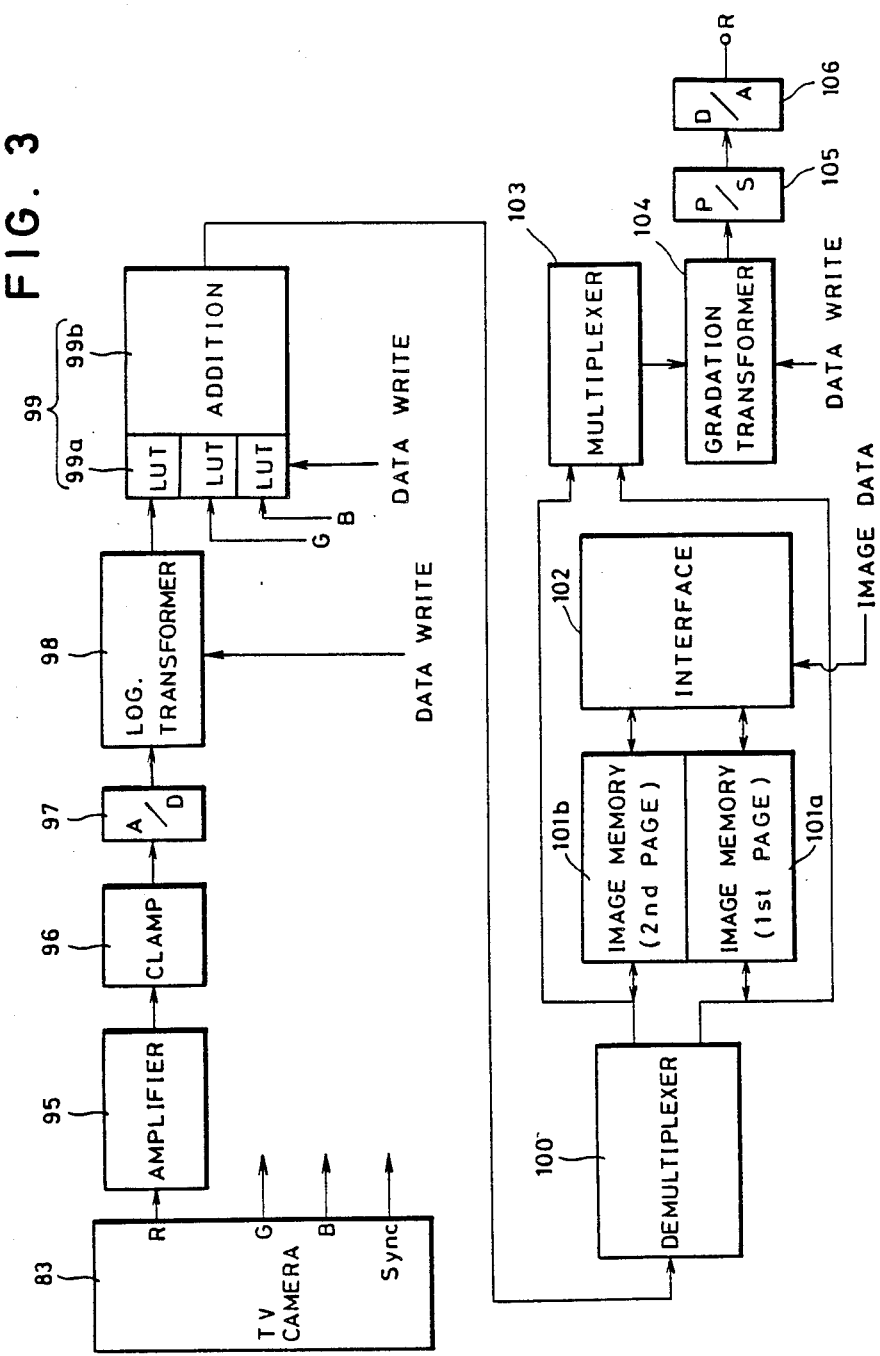
FIG. 3 is a block diagram showing an image signal processing section of FIG. 2.

FIG. 3 shows an embodiment of the image processing section 84 of FIG. 2. It is noted that image signal processing systems for red, green, and example, for red is shown in FIG. 3. As shown, red image signals R provided from the TV camera 83 are, after being amplified in an amplifier circuit 95, sent to a clamp circuit 96 to establish a reference level. Then, the red image signals are converted into digital signals in an A/D converter 97 and are sent to a logarithmic transformer 98 which comprises a look-up table memory. The logarithmic transformer 98 transforms the digital image signals into logarithmic values as image signals proportional to densities. The CPU 52 writes a data table stored in the ROM 89 in the logarithmic transformer 98 prior to reception of an image of a picture frame on the film framing mask 73 by the TV camera 83.

A chroma correction circuit 99 is provided, commonly for image processing systems of the three colors, to correct the difference in spectral sensitivity between a sheet of color paper and the image pick-up element of the TV camera 83, and comprises three look-up table memories 99a for each of the colors. Each of memory 99a is used to weight the corresponding color image data, and an adder 99b adds the weighted image data from the three look-up table memories 99a and outputs the resultant data as red image data. The CPU 52, before starting film analysis, reads out three coefficients from the ROM 89 and changes them stepwise to provide a set of three coefficients for chroma correction for red, and each coefficient is written in the corresponding look-up table memory 99a.

The image data thus corrected in chroma is then sent to one of image memories 101a or 101b designated by a demultiplexer 100. Each image memory 101a and 101b has a memory capacity sufficient for one full image area (which is hereinafter referred to as one page) of the screen 33a of the color monitor 33 and is alternately read out and written in. Therefore, while reading out image data for one page from the image memory 101a under the control of the read controller 86, image data for a new page provided from the TV camera 83 can be written in the image memory 101b by the memory controller 85. When the read controller 86 starts to read out the image data from the image memory 101b, the write controller 85 starts to overwrite new image data for another page in the image memory 101a. As is apparent from the above, the provision of the image memories 101a and 101b avoids the suspension of film analysis during the reading of image data.

For controlling the writing or reading of image data in the image memory 101a or 101b with the CPU 52, an interface 102 is provided. The image data read out from either one of the image memories 101a or 101b is sent to a gradation or contrast transforming circuit 104 through a multiplexer 103, wherein the image data is subjected to negative-to-positive transformation and gradation transform processing. The gradation transforming circuit 104 comprises sixteen look-up table memories, one for each of sixteen picture frames constituting one full image frame. In each look-up table memory, table data concerning the result of the measurement and table data prepared according to a manually inputted color correction value for each picture frame are written by the CPU 52. This table data can be provided by shifting the standard table data for each color stored in the ROM 89 with reference to a color correction value.

The image data thus gradation-transformed is converted into serial signals in a parallel-to-serial converter 105, and then converted into analog signals in a D/A converter 106. The image signals in analog form are sent to the color monitor 33.

Figure 4:
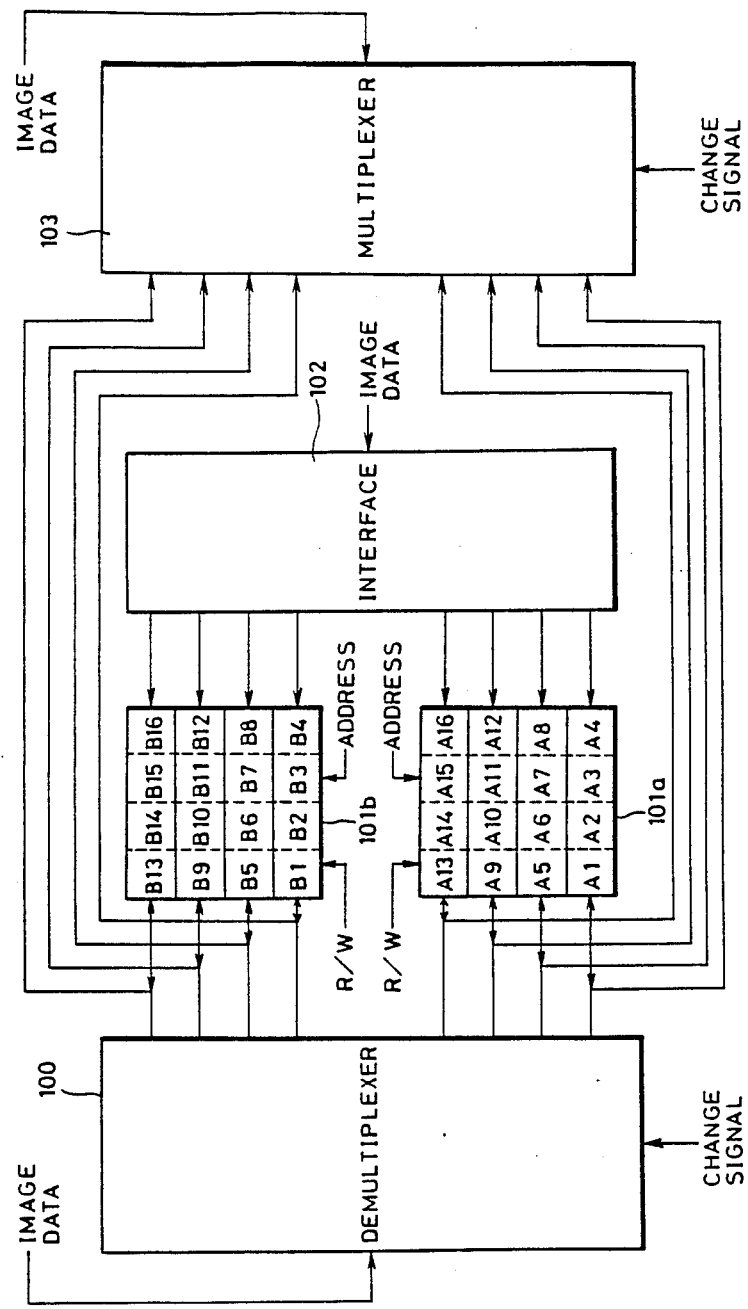
FIG. 4 is a block diagram showing details of an image memory of FIG. 3.

Referring now to FIG. 4, the image memories 101a and 101b are shown in detail. Each memory comprises four memory blocks each of which has four memory areas. Each memory area stores image data of a single picture frame. For example, the fourth-from-the-top line of a memory block of memory 101a has four memory areas A1 to A4 to store the image data for the picture frames to be displayed in the bottom line A on the screen 33a as shown in FIG. 5. The third line of memory a block has four memory areas A5 to A8 to store the image data of the picture frames to be displayed in the third-from-the-top line B on the screen 33a. The image memory 101b is identical in structure and operation to the memory 101a, and each memory area of the image memory 101b is specified with reference character B.

Figure 6:
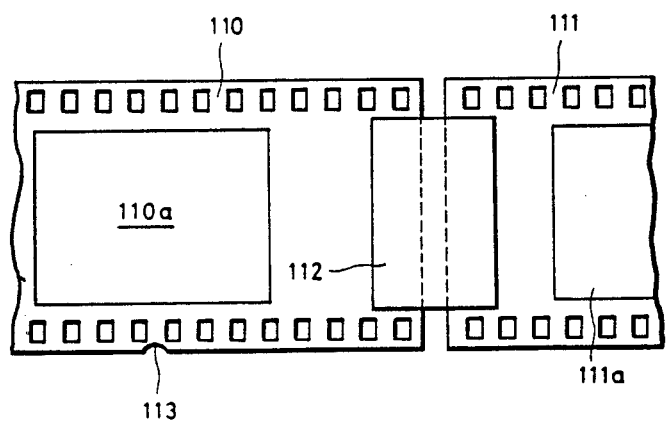
FIG. 6 is an illustration of part of a film consisting of a plurality of rolls of films spliced to one another.

FIG. 6 shows part of the spliced film 13 including a spliced line. Two rolls of film 110 and 111 are connected, between picture frames 110a and 111a, to each other with a splicing tape 112. The spliced film 13 comprises a number of rolls of films connected to one another by such splicing tape 112. The splicing tape 112 can be detected optically by the spliced line sensor 72. It is noted that the splicing tape 112 is made of materials, such as white adhesive tapes, having reflective or transmittance factors different from that of the spliced film 13. When the spliced line sensor 72 detects the splicing tape 112, the CPU provides data for a blank division and writes it in a corresponding memory area of a current image memory, for example the image memory 101a.

Figure 7:
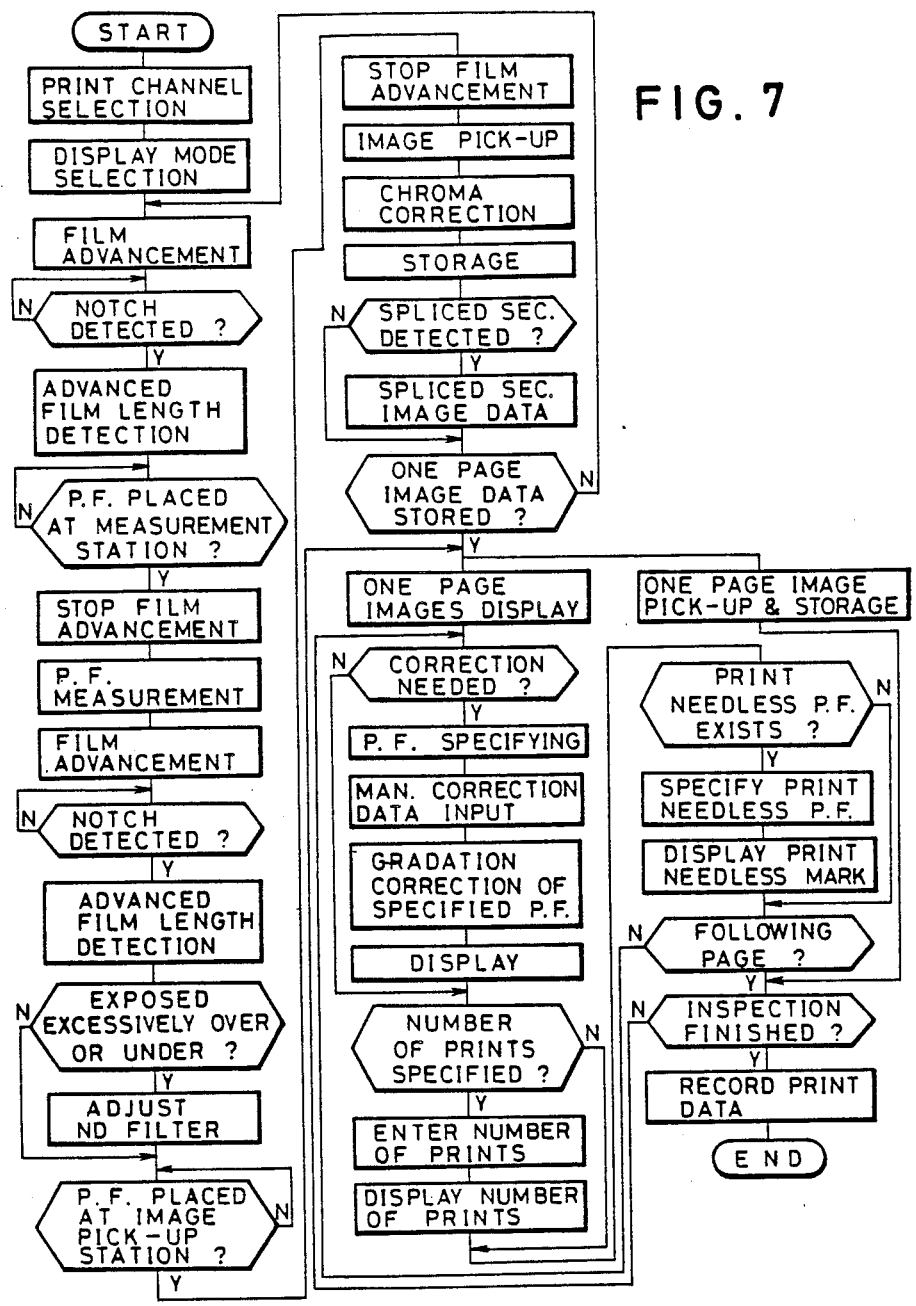
FIG. 7 is a flow chart illustrating the sequence of color film inspection.
Figure 8:
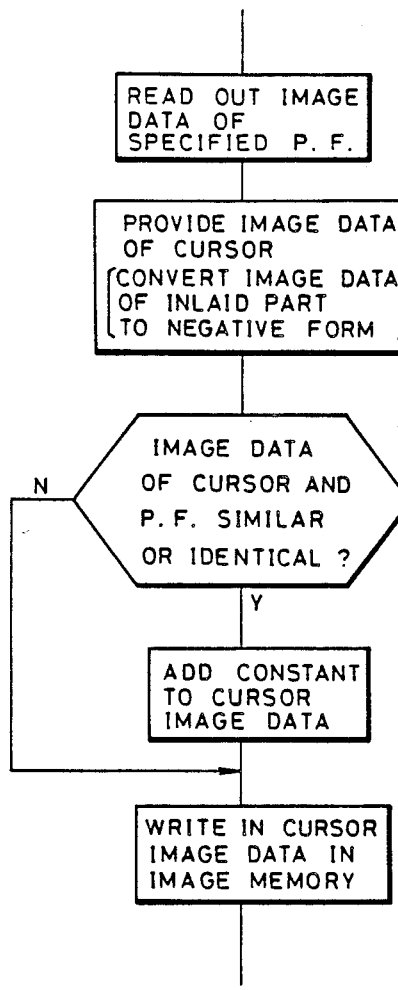
FIG. 8 is a flow chart illustrating the sequence of displaying a cursor for specifying an image.
Figure 9:
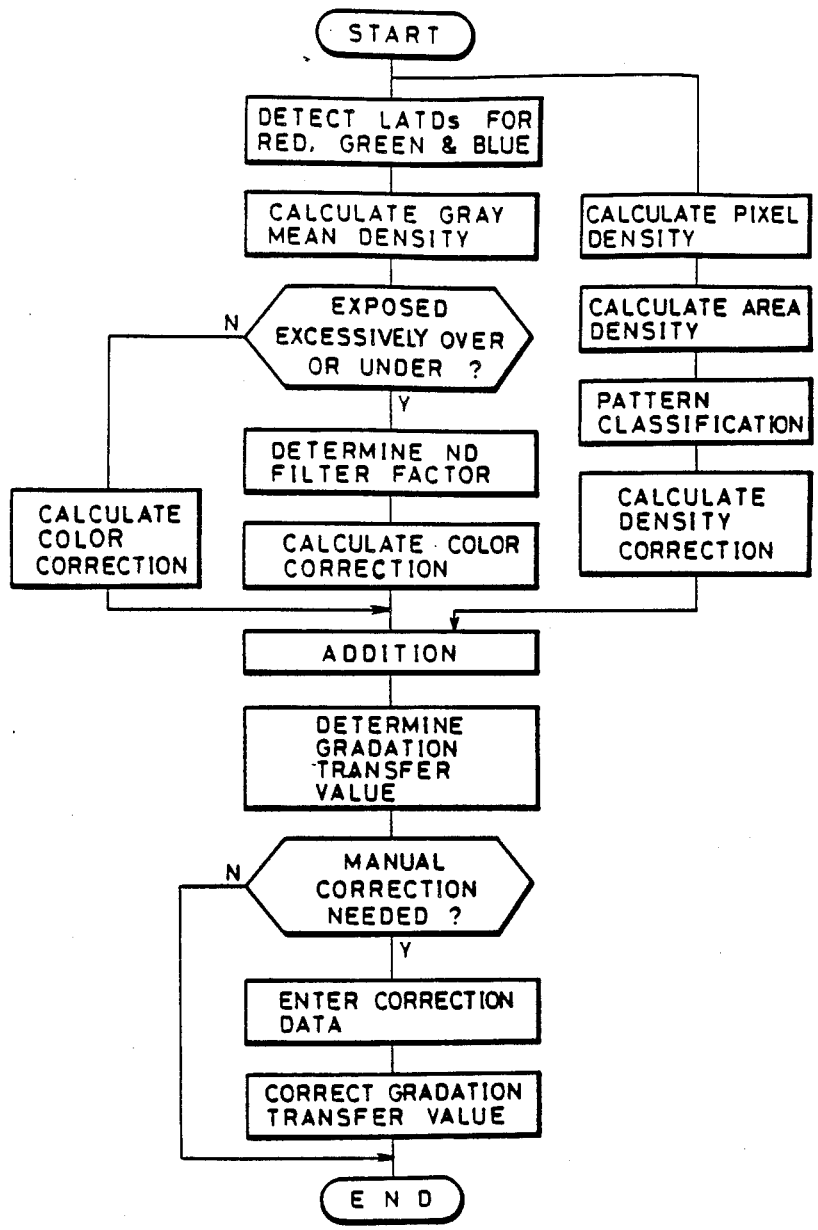
FIG. 9 is a flow chart illustrating the sequence of gradation transformation.

The operation of the color film analyzer depicted in FIGS. 1-4 is best understood by reviewing FIGS. 7-9, which are flow charts illustrating various sequences of operation. After switching on the color film analyzer, the color film analyzer is adapted so that the printing conditions correspond to a printer to be used by operating one or more of the alphanumeric keys 38 of the keyboard 34 to select the same printing channel as that of the printer. Thereafter, the type and size of the spliced film 13 and other necessary data are entered by operating the alphanumeric keys 38, and then a display mode, for example the sixteen-division display mode, is designated.

After mounting a reel 11, a leader tape attached to the leading end of the spliced film 13 is automatically threaded and wound around the take-up reel 12. When the spliced film 13 is advanced by means of the drive roller 16 driven by the pulse motor 53, the notch sensor 50 detects a first notch 113 and provides a notch signal. Upon the generation of the notch signal, drive pulses applied to the pulse motor 53 are counted to meter a length of the spliced film 13. When a sufficient number of drive pulses have been counted so that the first notch 113 is advanced by a length equal to the distance between the notch sensor 50 and the center line of the film framing mask 54 at the measuring station, the pulse motor 53 stops its rotation so that the picture frame with the first notch 113 is placed in position in the film framing mask 54 at the measuring station.

The picture frame with the first notch 113 in the film framing mask 54 is illuminated by the lamp 55 and is measured by the scanner 58 to detect densities of the respective pixels of the picture frame. At the same time, the color sensors 59-61 for red, green, and blue detect red, green, and blue LATDs of the picture frame. Thereafter, the pulse motor 53 is restarted to advance the spliced film 13 until a second notch 113 is detected, and a picture frame with the second notch 113 is placed in position in the film framing mask 54 at the measuring station. The same procedures are repeated for all picture frames with notches 113.

The first notch 113 of the first picture frame thus measured is detected a second time by the notch sensor 71 disposed between the measuring station and the image pick-up station. Upon the detection of the first notch 113, drive pulses applied to the pulse motor 80 are counted to meter a predetermined length of the spliced film 13. Thus, the first picture frame is placed in position in the film framing mask 73 at the image pick-up station. During the positioning of the first picture frame at the image pick-up station, based on the LATDs detected by the color sensors 59-61, a determination is made as to whether the first picture frame has been properly exposed, excessively over-exposed, or excessively under-exposed. If the picture frame is excessively over-exposed, the CPU 52 actuates the pulse motor 77 to remove or displace the ND filters 76 from the optical path, to increase the quantity of light with which the first picture frame is illuminated. On the other hand, if the first picture frame is excessively under-exposed, the CPU 52 actuates the pulse motor 77 to insert the ND filters 76 into the optical path, to decrease the quantity of light with which the first picture frame is illuminated.

Since the position of the ND filters 76 has been adjusted before the first picture frame is placed in position at the image pick-up station, as soon as the first picture frame is placed at the image pick-up station, the TV camera can receive an image of the first picture frame and provide time serial image signals separately by color. The time serial image signals for red, green, and blue are sent to the image processing section 83, and therein are subjected to analog-to-digital conversion, chroma correction, storage, and gradation transformation. As was previously described in connection with FIG. 3, the red image signals are converted into red image data in the A/D converter 97 after amplification and clamping. The red image data is then converted into data proportional to the density and sent to the chroma correction circuit 99. There, the respective density-proportional image data are multiplied by respective coefficients. The resultant red image data thus obtained is sent to an image memory, for example the memory 101a, designated by the demultiplexer 100 and written in the first memory area A of the sixteen memory areas designated by the write controller 85. In the same manner, subsequent picture frames are placed at the image pick-up station and images of the picture frames are picked up by the TV camera 83. Image data of these picture frames are written in the memory areas A2, A3, ... of the image memory 101a in the order that they are received.

Upon advancing the film 13, the spliced line sensor 72 optically detects the splicing tape 112, attaching the rolls of films 110 and 111, to generate a splice signal and sends it to the CPU 52. The CPU 52 writes "blank" data, namely "zero" in digital form, in a memory area between the areas where image data of the adjacent picture frames of the spliced films 110 and 111 has been and will be written. For example, the "zero" data is written in the memory area A11 of the image memory 101a to display a blank on the division 46 of the screen 33a. In the division of the screen on the left hand side of the division 46 an image of the last picture frame of the film 110 is displayed, and in the division of the screen on the right hand side of the division 46 an image of the first picture frame of the film 111 is displayed.

When image data of the sixteen picture frames including a spliced section as a splice frame are written in the image memory 101a, the demultiplexer 100 selects the other image memory 101b, and simultaneously the CPU 52 begins to read out image data from the image memory 101a. In such a manner, the image memories 1101a and 101b are alternated between write-in and read-out modes.

When the image memory 101a is in the read-out mode. the read controller 86 reads out image data from the image memory 101a and sends it to the gradation transformer 104 through the multiplexer 103 for negative-to-positive image conversion and gradation transformation. Since the gradation transformer 104 has a look-up table memory for each division of the screen 33a, the gradation of the image data is corrected with look-up table data for the corresponding division where the image data is displayed as a positive image. The respective look-up table memories store table data generally different from one another according to images of the respective picture frames. The table data is, as was previously described, provided by shifting the standard table data stored in the ROM 89 with reference to a density correction value based on data detected by the scanner 58 and a color correction value based on data detected by color sensors 59-61.

The gradation corrected image data are converted into serial signals by the parallel-to-serial converter 105, and then into analog signals by the A/D converter 106. The analog image signals are sent to the color monitor 33 to display one page of positive color images for sixteen picture frames, namely fifteen positive color images 45 and one blank image 46 on the respective divisions of the screen 33a. These images are practically separated with white margins from one another on the screen 33a.

Because the images displayed on the screen 33a of the color monitor 33 are temporarily simulated as printed images, a determination should be made whether their color balance and color density are suitable. Since a spliced section of the spliced film 13 is displayed as the blank image 46 on the screen 33a, the first picture frame of each roll of film can be identified. Generally, it may be desirable to finish prints of one roll of film with the same tone. For this reason, a determination is made whether all of the images between two blank images are substantially similar in color and density.

If the simulated image on any division of the screen is not suitable, the picture frame specifying keys 40 of the keyboard 34 are operated to designate the picture frame having the unsuitable simulated image. As a result, as shown in FIG. 8, the image data of the picture frame thus specified is read out from the image memory 101a and written in the RAM 90 through the interface 102. Then from the RAM 90, image data of part of a specified image, where an image of the cursor 47 is to be inserted, is read out and sent to the CPU 52. The image data of the part of the specified image are converted from negative form to positive form and changed to image data of the cursor 47.

Generally, when inserting an image of the cursor 47 in a specified image on the screen 33a, the image of the cursor 47 should preferably be significantly different in color from the part of the image surrounding the cursor image. To make the image of the cursor 47 different in color from the image of the specified image which the cursor image overlaps, the image data of the cursor 47 is compared with the image data of the specified image stored in the RAM 90 to determine the similarity of color between both data. If, in fact, these data are similar or identical in color, the data of the cursor image is added or subtracted by a constant value.

The image data of the cursor 47 thus obtained is sent to the image memory 101a through the interface 102, which is temporarily changed to the write-in mode, and written in the memory area from which the image data of the specified image has been read out. The image data written in the image area of the image memory 101a is converted from negative form to positive form in the gradation transformer 104, and therefore the image of the cursor 47 is displayed as a positive image as part of the specified positive image. If the wrong picture frame is specified, a clear key is operated to rewrite the image data of the incorrectly specified picture frame in the RAM 90 into the corresponding memory area of the image memory 101a. Thus, the image of the incorrectly specified picture is displayed on the screen 33a without the image of the cursor 47.

After a picture frame is specified, the color key 35 and/or density key 36 are operated manually to enter color and/or density correction data. According to this correction data, look-up table data of a look-up table memory, corresponding to the division where the image of the specified picture frame is located, is revised to correct color and/or density of the image of the specified picture frame. If the first correction is insufficient, the color key 35 and/or density key 36 are operated again. If an image of another picture frame is required to be corrected in color and/or density, the picture frame specifying keys 40 are operated to write the image data of the previously specified picture frame temporarily stored in the RAM 90 in the image memory 101a and written in the RAM 90. Thus, the image data of previously specified picture frames are replaced with newly specified picture frames. As a result, the image of the cursor 47 disappears from the corrected image of the previously specified picture frame and appears in the image of the newly specified picture frame. The image of the newly specified picture frame can be corrected in color and/or density in the same manner.

When making prints during development of a roll of film, the printer automatically provides one print for each picture frame. Therefore, it is not necessary to specify the number of prints to be made. However, if more than one print is requested, the numbers of prints to be made are specified for the respective picture frames. In addition, when extra prints will be requested later, the number of extra prints is to be specified for the picture frame. After specifying the picture frame through the picture frame specifying key 40, the alphanumeric keys 38 of the keyboard 34 are operated to enter the number of extra prints. The CPU 52 reads out image data for the picture frame specified from a memory area, for example the memory area A8, of the image memory 101a, and temporarily stores them in the RAM 90. The temporary storage of image data is effected to display the original image of the specified picture frame on the screen 33 when the specified number of prints is erased from the screen by operating the clear key. The CPU 52 provides image data of the number of prints and writes it in the memory area A8 of the image memory 101a. Data for the specified picture frame and the number of prints, which are read out simultaneously, are displayed as an inlaid image on the screen 33. In this embodiment, the number "3" is displayed as a bright image with a square dark background at location 48 in FIG. 5.

When the same number of prints are requested for all of the picture frames of a roll of film, the division 46, where a blank image at the head of a series of images of the picture frames of the roll of film is displayed is specified through the frame picture specifying keys 40. Then, the number of extra prints to be made for all the picture frames is specified. As a result, a specified number 46a is displayed substantially at the center of the specified division 46 as a bright image with a dark background.

In the case where the same number of extra prints are requested for almost all of the picture frames of a roll of film excepting some picture frames, after specifying the division of a blank image and the number of prints common to almost all of the picture frames, each exceptional picture frame and the number of prints for each exceptional picture frame are specified. The common number and exceptional numbers are both stored in the RAM 67 and recorded as punched codes in the paper tape 30 after the completion of negative film analysis.

If the image displayed on the screen 33 is blurred or has no major subject, the picture frame specifying keys 40 are operated to specify the picture frame of the image, and then the key 39 is operated to indicate that it is not necessary to make a print from the specified picture frame. As a result, the image data of the specified picture frame stored in a memory area of the image memory 101a, for example the memory area A2, is transferred to the RAM 90 and part of the image data of the specified picture frame is retrieved, converted into a negative image data, and then written in the memory area A2. In such a way, an image of the specified picture frame with a negative center area is displayed in a specified division of the screen 33a. The negative center area forms a mark 49 indicating that a print is unnecessary. This mark 49 may be colored if desired.

When all of the displayed images are analyzed and judged to be suitable, the page change key 41 is operated to replace the analyzed images with the following page of images. The image data of sixteen picture frames which may include a spliced section are read out from the image memory 101b and displayed as positive images on the screen 33a of the color monitor 33 in the same manner as the previous page if of images. During the analysis of the following page of images, another sixteen images are picked up by the TV camera, and image data of the sixteen picture frames are written in the image memory 101a.

When all of picture frames of the spliced film 13 have been analyzed, the operation key 39 is operated to record the print data in the RAM 67 as punched codes in the paper tape 30. The paper tape is punched to record data codes indicating, for example, the spliced section 46, film type and film size, common data including the number of prints common to all of the picture frames in this order, and thereafter exposure correction data, and the number of prints or unnecessary print data for each picture frame.

The data tape 30 is set in a printer for making prints from the analyzed spliced film 13. The printer reads the common data first and then sequentially the data individual to each picture frame required to be printed during the printing of the required picture frame. According to these data, the printer is controlled to make favorable prints. The printer is provided with color sensors for detecting red, green, and blue large area transmittance densities (LATDs). Based on the detected LATDs, exposures for red, green and blue are determined. From these exposures and exposure correction data read from the data tape 30, actual exposures are obtained with which the printer controls the proportion of light for the three colors.

When one page of images is selected in the twelve-division display mode, the magnetic floppy disk 29 is set in the color film analyzer. The color film analyzer reads the four reference images from the floppy 29 and writes them in the RAM 90. The image data of these reference images are read out and written in the memory areas A13-A16 of the image memory 101a and the memory areas B13-B16 of the image memory 101b which correspond to the first or uppermost line of divisions D of the screen 33a of the color monitor 33. Accordingly, images of the spliced film 13 are picked up by twelve frames and displayed in the lower three lines of divisions A-C of the screen 33a.

During analysis, images of the spliced film 13 displayed in the lower three image lines A-C are compared with any one or all of the reference images in the first image line D to simulate favorable images.

When an image is selected to be displayed in the single image display mode, the image pick-up and display is effected for a picture frame. In this case, the image data of one picture frame is magnified and displayed on the central four divisions of the screen 33a of the color monitor 33. The magnification of image is effected either in an electrical interpolation of image data or in shortening the sampling period of the A/D converter 97. This image magnification may be effected for any one of the images displayed in the sixteen or twelve division display mode when one image is specified for color correction.

Referring now to FIG. 9 showing the sequential operation of gradation transformation, each picture frame of the film placed at the measuring station is measured by the scanner 63 and color sensors 59-61 to detect densities of each pixel of the picture frame and LATDs of the picture frame for red, green, and blue, respectively. The LATDs are arithmetically averaged to provide a gray mean density. The gray mean density thus obtained is compared with reference gray mean densities of an excessively over-exposed picture frame and of an excessively under-exposed picture frame. If the gray mean density of the measured picture frame is higher than the reference gray mean density of the excessively over-exposed picture frame, the measured picture frame is determined to be excessively over-exposed. On the other hand, if the gray mean density of the measured picture frame is lower than the reference gray mean density of the excessively under-exposed picture frame, the measured picture frame is judged excessively under-exposed. Based on this determination, the ND filters are controlled to make a proper exposure in the previously described manner. For an excessively over-exposed or under-exposed picture frame, color correction values for cyan, yellow, and magenta are calculated based on the LATDs. For picture frames other than such excessively over-exposed and under-exposed picture frames, color correction values for red, green, and blue are calculated based on the LATDs.

The scanner 58 scans the picture frame at the measuring station to detect densities of a number of points within a previously specified area. From these densities an arithmetic mean density is calculated for the specified area. In a similar manner, arithmetic mean densities for a plurality of areas of the picture frame are calculated. Based on these mean densities, the picture frame is classified as a normally illuminated scene or a backlit scene. A density correction value for each color is calculated by using one of previously provided operation formulas according to the classified scene.

The color correction value and density correction value thus obtained are added together by color, and then are written in the RAM 67. Here, density correction is represented by a correction value for cyan, magenta, or yellow, and the density correction value is added to the color correction value after being converted into a color correction value, by color. Based on the added correction value a gradation transforming value is calculated for each color by which the standard table data is shifted. These calculations are performed after the measurement of the picture frame and before the following picture frame is placed at the measuring station.

As was previously described, the RAM 89 stores standard table data which differs according to color for the respective colors. Accordingly, each standard table data is read out and shifted according to the gradation transforming value of a corresponding color and then written in corresponding area of the gradation transformer 104.

If a manual correction is effected, a manually inputted color correction value and manually inputted density correction value in the form of a color correction value are added to the color correction value read out from the RAM 67, and based thereon a gradation transforming value is calculated to shift again the standard table data. Thereafter, the shifted standard table data is written in the gradation transformer 104.

Figure 10:
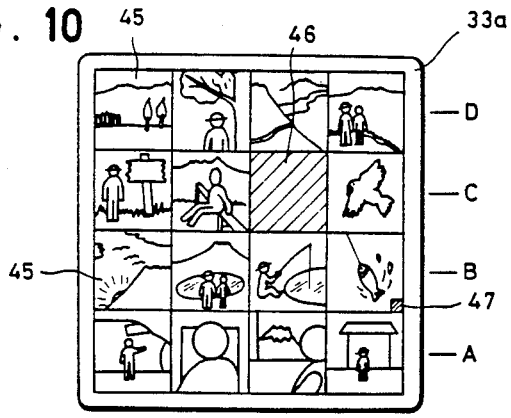
FIG. 10 is an illustration of a screen of a color image display device according to another embodiment of the present invention.

Referring now to FIG. 10 showing the screen 33a of the color monitor 33 on which images of sixteen picture frames of the spliced film 13 are displayed, the number of prints for the respective picture frames of a roll of film is not specified. Therefore, the respective divisions of the screen 33a of the color monitor 33 do not display any number thereon, even in the central division on which a spliced section of the spliced film 13 is displayed as a blank image 46.

Figure 11:
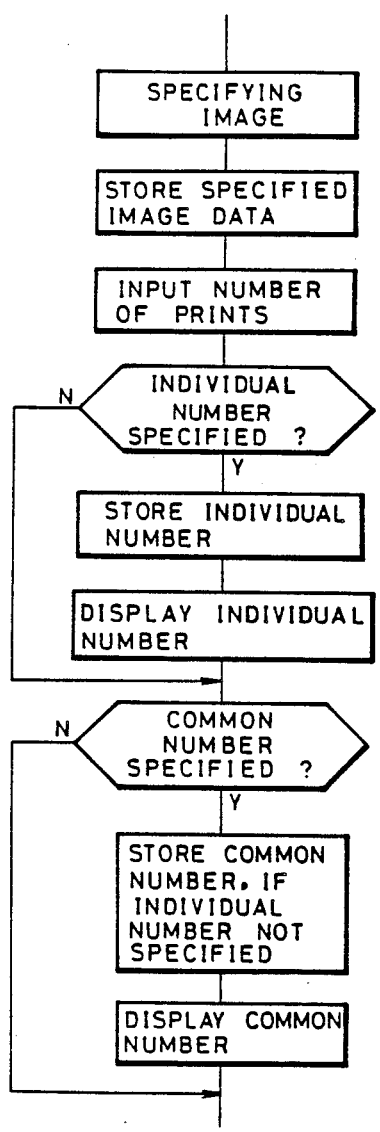
FIG. 11 is a flow chart illustrating the sequence of specifying the number of prints individual to each picture frame prior to that common to the respective picture frames to be printed.

Referring now to FIG. 11 showing the sequential operation for individually specifying the number of prints for the respective picture frames of a roll of film included in the spliced film 13, if a number of prints specified is common to the respective picture frames of the roll of film, any individually specified number of prints is preferentially used in printing. The number of prints for a specified picture frame is entered as individual printing data, and is stored in the RAM 67 corresponding to image data of the specified picture frame. If the number of prints is specified as a printing data common to a plurality of picture frames of the roll of film of the spliced film 13, the common number of prints is also stored in the RAM corresponding to image data for each picture frame. When the common and individual numbers of prints are both specified for a picture frame to be printed, the CPU 52 preferentially writes not the common number of prints, but the individual number of prints in the RAM 67. Accordingly, double punched codes of the number of prints are not formed in the paper tape. In more detail as shown in FIG. 11. when the number of prints for a picture frame of the spliced film 13 are individually specified, image data of the picture frame is stored in the RAM 67. Then, data concerning the number of prints is entered through the alphanumeric keys 38. The CPU 52 makes a first determination of whether an individual number of prints has been selected for the specified picture frame. If the answer is yes, the CPU 52 stores data indicating the individual number of prints in the RAM 67 corresponding to the image data of the specified picture frame, and displays the specified individual number on the division of the screen 33a where the specified picture frame is displayed. Thereafter or when the answer to the first determination is no, the CPU 52 makes another determination whether a common number of prints has been specified for a preceeding spliced section. If the answer to this determination is yes, the CPU 52 stores data for the common number of prints corresponding to the image data of the specified picture frame if the specified picture frame has no individual number of prints. Then, the common number of prints is displayed. If the answer to the second determination is no, the last two steps are omitted.

Figure 12:
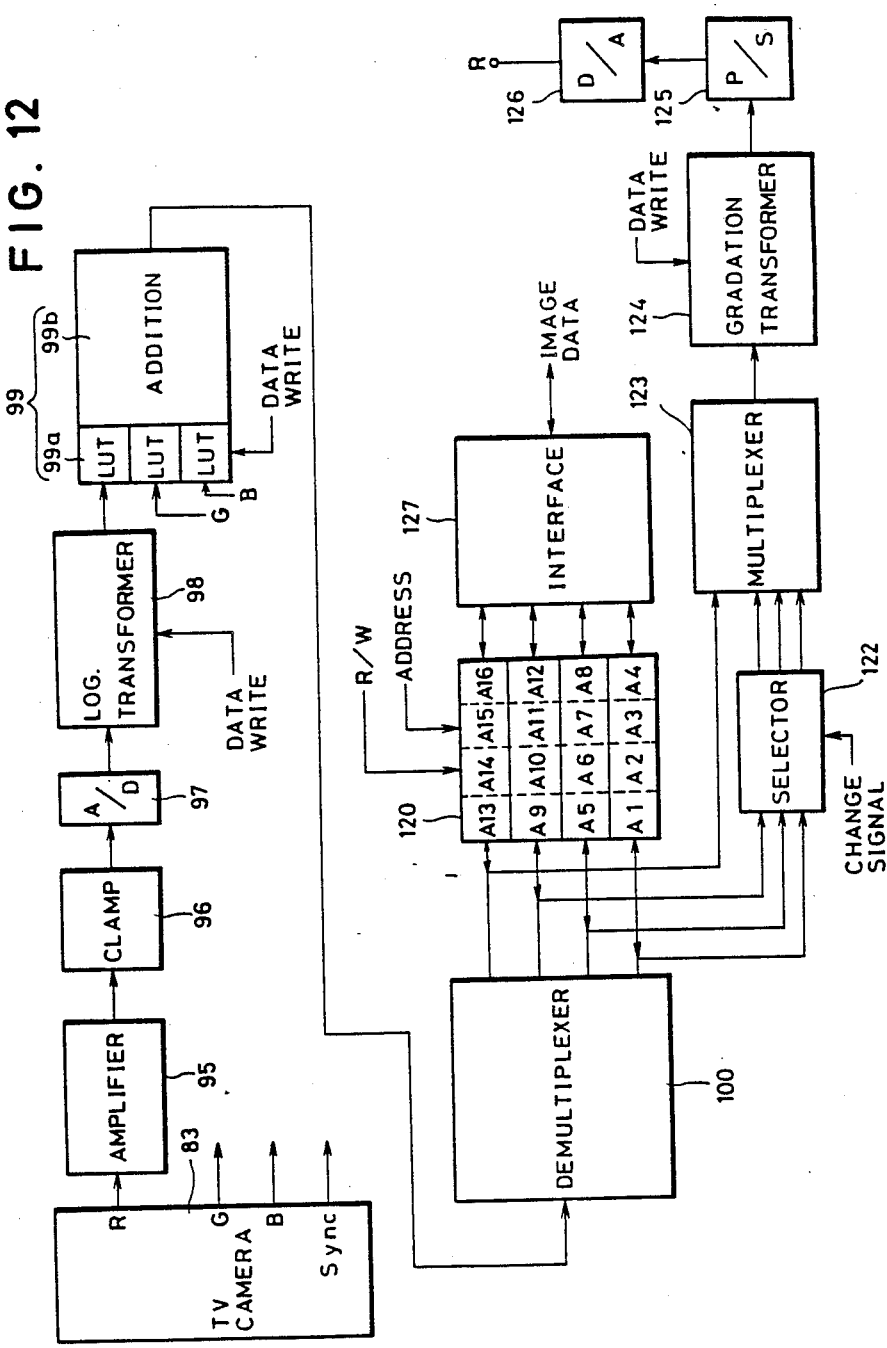
FIG. 12 is a block diagram showing another embodiment of an image signal processing section.

Referring to FIG. 12 showing another embodiment of the image processing section 84 of FIG. 2, elements which are identical in structure and operation to those of the previously described embodiment shown in FIG. 3 are designated by the same reference numerals and need not be explained again.

Figure 13:
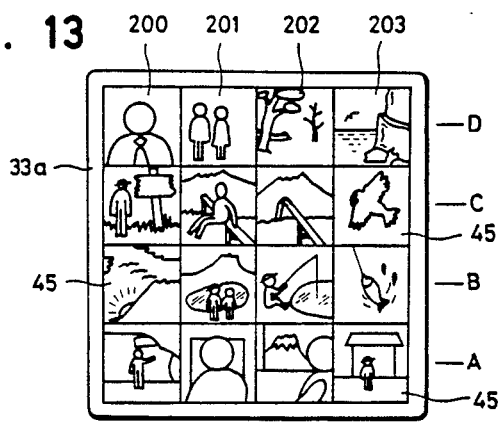
FIG. 13 is an illustration of a screen of a color monitor showing an image arrangement before specifying a subject image.

The image data for red corrected in the chroma correction circuit 99 is sent to an image memory 120 through a demultiplexer 100. The image memory 120 comprises four memory blocks having four memory areas A1–A4, A5–A8, A9–A12, and A13–A16, respectively. Each memory area can store image data for one picture frame. The first memory block having the memory areas A13–A16 stores image data of the four reference images 200–203 which are to be displayed on the uppermost division line D of the screen 33a as shown in FIG. 13. The second memory block having the memory areas A9–A12 stores image data of images 45 for four picture frames of the spliced film 13 which are displayed on the second-from-the-top division line C. In this manner, image data of picture frames of the film 13 are stored individually in the memory areas A1–A12. Image data of picture frames to be printed which are stored in the second through fourth memory blocks of the image memory 120 are sent to a multiplexer 123 through a selector 122. The selector 122 has three input terminals, first through third, and three output terminals, first through third, and changes the connections between the input and output terminals according to a change signal from the CPU 52 so as to substantially exchange the location of the third and fourth memory blocks in the image memory 120. By exchanging the connection between the input and output terminals, images displayed on the second through fourth division lines B–D can be exchanged. Accordingly, any image line can be shifted to be adjacent to the uppermost reference image line A. This is convenient for comparing an image in the image line shifted adjacent to the reference image line with any one of the reference images for color and density inspection. The first block of the image memory 120 is connected directly to the multiplexer 123.

The multiplexer 123 selectively sends image data from the four memory blocks of the image memory 120 to a gradation transforming circuit 124 wherein the image data is subjected to negative-to-positive transformation and gradation transformation processing. The gradation transformer 124 comprises sixteen look-up table memories one individual to each of four reference images and the twelve picture frames of the spliced film 13. The look-up table memory for the four reference images carries a standard table data transferred from the ROM 89. Each of the remaining look-up table memories stores table data provided by shifting the standard table data from the ROM 89 according to the result of measurement and manually inputted correction data.

The red image data thus transformed in gradation by color is converted into serial signals in a parallel-to-serial converter 125 and then into analog signals in a D/A converter 126. The red image signals thus processed are sent to the color monitor 33. In the same manner, the image data for green and blue from the TV camera 83 are processed and sent to the color monitor 33. An interface 127 connected to the image memory 120 enables write in and read out of image data from the image memory 120 by the CPU 52.

Before inspecting picture frames to be printed, the magnetic floppy disk 29 is loaded in the color film analyzer through the floppy loading slot 28. The color film analyzer reads the four reference images 200-203 from the floppy disk 29 and writes them in the RAM 90. The image data of the reference images 200-203 are read out and written in the memory areas A13-A16 of the image memory 120 which correspond to the first or uppermost division line D of the screen 33a of the color monitor 33. Accordingly, images of the spliced film 13 are received for twelve frames by the color TV camera 83 and displayed on the lower three division lines A-C of the screen 33a of the color monitor 33.

During the analysis of the images of the picture frames displayed on the lower three image lines A-C a comparison is made to one or all of the standard reference images 200-203 on the uppermost or the first reference image line D to simulate favorable printed images. If any one of the displayed images is determined to be unfavorable as a printed image, the image is specified by operating the picture frame specifying keys 40 of the keyboard 34.

Figure 14:
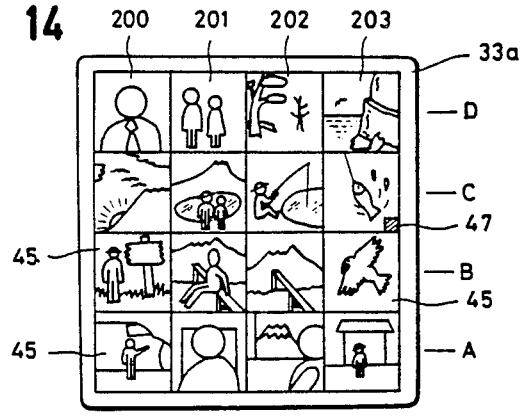
FIG. 14 is an illustration similar to FIG. 13 but after having specified a subject image.

The image data for the specified image is read out from the image memory 120 and written in the RAM 90 through the interface 127. Then, the CPU 52 reads part of the image data from the RAM 90 where an image of a cursor 47 for specifying the picture frame is to be inserted as shown in FIG. 14. The image data for the inserted part of the specified picture frame is converted from negative form, to positive form and is thereby changed to image data for the cursor 47, When inserting the image of the cursor 47 in the specified image on the screen 33a, the image of the picture frame specifying cursor 47 is preferably significantly different in color from the image surrounding the cursor. To this end, the image data of the cursor 47 is compared with the image data of the specified image stored in the RAM 90 to determine the similarity in color between both data. If in fact the data are similar or identical in color to each other, the data of the cursor image is changed to show a different color.

The image data of the picture frame with cursor 47 thus obtained is sent to the image memory 120 through the interface 127 and written in the memory area in which the image data of the specified image has been written. The image data of the picture frame with cursor 47 written in the image area of the image memory 120 is converted from negative form to positive form in the gradation transformer 124, and therefore the image data is displayed as a positive image as well as the image of the specified picture frame.

Immediately after the numerical key 40 is operated to specify the picture image, the CPU 52 provides the selector 122 with a change signal to exchange the connections of the input and output terminals so as to connect the memory block in which the image data of the specified image is included to the second image line C. For example, if an image on the third image line B is specified, the selector 122 connects the first input terminal to the second output terminal and the second input terminal to the first output terminal but maintains the connection between the third input and third output terminals. As a result, the image data in the second and third memory blocks of the image memory 120 are displayed on the third and second image lines, respectively. Thus, the image line which includes the specified image is shifted so as to be adjacent to the reference image line D. Accordingly, an image of any specified picture frame can be located close to the reference images 200-203 as shown in FIG. 14, enabling easy comparison of the image with the reference images for image evaluation and inspection.

After the specification of an image, the manual color key 35 and/or density key 36 are operated to enter color and/or density correction data. Based on the manual correction data, look-up table data for the look-up table memory, corresponding to the division for the image of the specified picture frame, is revised to correct the color and/or density of the image of the specified picture frame. If the first correction is insufficient, the color key 35 and/or density key 36 are operated again. If the color and density of an image of another picture frame is required to be corrected, the picture frame specifying keys 40 are operated, and the images which were exchangeably shifted onto the image lines C and B are shifted back onto the image lines B and C where they were originally displayed. Simultaneously, the image data temporarily stored in the RAM 90 are returned into the memory areas of the image memory 120. As a result, the image of the cursor 47 disappears from the corrected image of the previously specified picture frame and appears in the newly specified image. Of course, the image line including the cursor image will shift adjacently to the reference image line D. The newly specified image can be corrected in color and/or density in the same manner.

If no correction is needed for all the images displayed on the screen 33a, the next page key 56 is operated. The CPU 52 operates to display images of another twelve picture frames to be printed in the same manner as described above.

When all of picture the frames of the spliced film 13 have been evaluated or inspected and suitably corrected if desired, the operation key 39 is operated to record the print data in the RAM 67 as punched codes in the paper tape 30. The paper tape is punched to record data codes indicating exposure correction data for the respective picture frame to be printed. The data tape 30 is set in a printer for making prints from the analyzed spliced film 13. The printer reads the data for each picture frame which is to be printed. According to this data, the printer is controlled to make favorable prints having corrected color and density. The printer is provided with color sensors for detecting red, green, and blue large area transmittance densities (LATDs). According to the detected LATDs, exposures for red. green, and blue are determined. Based on the exposures and the exposure correction data read from the data tape 30, accurate exposures are obtained for automatically controlling the proportion of the three primary colors of printing light.

FIG. 15 shows still another embodiment of the image processing section 84 of FIG. 2. It is noted in this embodiment that elements which are identical in structure and operation to those of the previously described embodiment shown in FIG. 12 are designated by the same reference numerals and need not be explained again.

The image memory 120 stores the image data of four reference images in memory area A13-A16 of the first block which are displayed on the uppermost division line D of the screen 33a, and the images of twelve picture frames of the spliced film 13 are stored in the memory areas A9-A12, A5-A8, and A1-A4 of the second to fourth memory blocks and are displayed on the second to fourth division lines B, C, and D. respectively, An interface 141 transfers image data between the image memory 120 and the RAM 90 or an image magnifying circuit 142. The image magnifying circuit 142 electrically interpolates the image data of a picture frame specified through the picture frame specifying keys 40, so that it is four times as large as the image originally displayed on the screen 33a. The interpolated image data is written in the four centrally located memory areas A6, A7, A10, and A11 of the image memory 120. Before writing in the interpolated image data, the image data of four picture frames previously stored in the memory areas A6, A7, A10, and A11 are temporarily stored in the RAM 90.

A multiplexer 144 selectively sends image data from the four memory blocks of the image memory 120 to a gradation transformer 145 where the image data is subjected to negative-to-positive transformation and gradation transformation processing. The gradation transformer 145 comprises sixteen look-up table memories, one individual to each of the four reference images and the twelve picture frames of the spliced film 13. The look-up table memory for the four standard reference images 200-203 carries standard table data transferred from the ROM 89. Each of the remaining look-up table memories stores table data provided by shifting the standard table data from the ROM 89 according to the result of measurement and manually inputted correction data.

The red image data thus transformed in gradation by color is converted into serial signals in a parallel-to-serial converter (P/S) 146 and then into analog signals in a D/A converter (D/A) 147, and are then sent to the color monitor 33. In the same manner, the image data for green and blue from the TV camera 83 are processed and sent to the color monitor 33.

Figure 16:
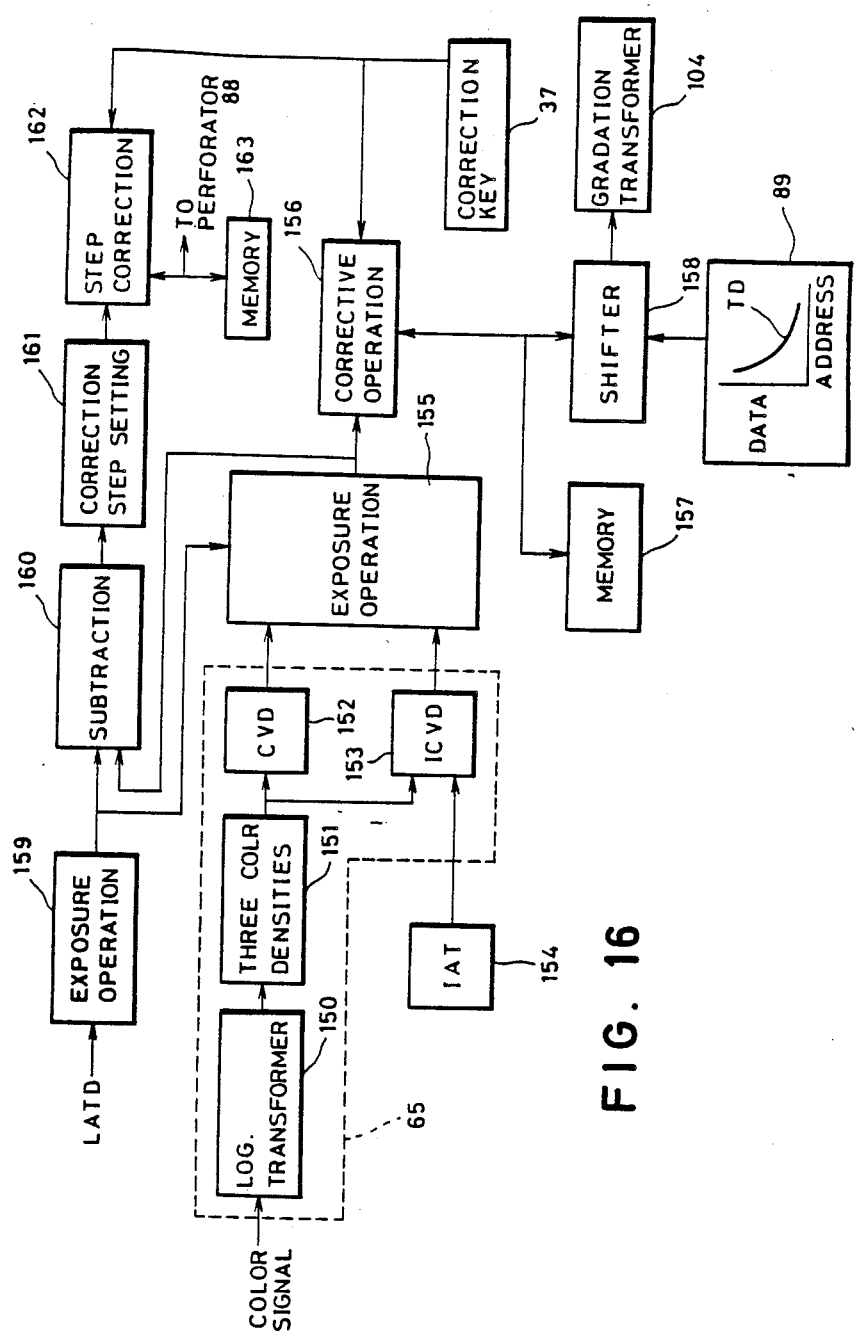
FIG. 16 is a functional block diagram illustrating a calculation procedure of exposures and a procedure of providing look-up table data.

FIG. 16 shows details of the operation unit 65 for calculating exposures and providing table data. in cooperation with the CPU 52. The three color signals detected by the scanner 58 are sent to the operation unit 65 through the A/D converter 64. The color signals are logarithmically transformed by the logarithmic transformer 150 to provide three color density signals which in turn are separately stored in a memory 151 by color. The three color density signals are then sent to an image characteristic value drawing section (CVD) 152 for drawing image characteristic values. When a principal image is specified, data concerning whether each scanned point is of the specified principal image is sent to, and stored in, a principal image area table section (IAT) 154. Referring to the data in the principal image area table section (IAT) 154, a principal image characteristic value drawing section (ICVD) 153 reads out the three color density signals of points of the specified principal image from the memory 151, thereby drawing color image characteristic values of the specified principal image for the respective colors.

The exposure operating section 155 has a plurality of exposure calculation formulas for images whose principal image is specified and images whose principal image is not specified, and selects one of the formulas. By substituting the image characteristic values into the selected formula, exposures can be calculated for the respective colors.

The exposure for each color is sent to a corrective exposure operating section 156, and is increasingly or decreasingly corrected in a stepwise manner corresponding to the correction keys (color correction key and density correction key) 37 which may have been operated. The corrected exposure for each color is stored in a memory 157, and also is sent to a shifter 158. The shifter 158 shifts the standard table data read out from the ROM 89 by the corrected exposure for each color. For example, a curve of the standard table data (TD) is shifted in the direction of the address axis. With this shifted standard table data the degree of gradation transformation in the gradation transformer 104 is changed. The shifted table data is written in a look-up table memory of the gradation transformer 104 corresponding to the specified image.

Widely available color printers utilize the LATD printing system. For this reason, the exposure operating section 159 is provided to calculate exposures for the respective colors based on the LATD values. A subtracting section 160 compares the calculated exposures calculated in the exposure operation sections 155 and 159 for each color to obtain the difference of exposure therebetween. This difference of exposure is transformed into a color or density correction step by the operation of the color or density correction key in a correction step effected with the color or density correction key in a correction step setting section 161. If the correction key 37 has been operated previously, a step correction section 162 adds or subtracts the correction steps from the correction step setting section 161 and the correction key 37. The resultant correction step is stored as correction data in a memory 163. At the end of inspection, the correction data is recorded as a punched code in the paper tape 30 by the perforator 88.

To specify a principal image in the displayed image of a picture frame on the screen 33a, a principal image specifying means such as a light pen 94 connected to a coordinate position detect circuit 93 is provided. When specifying a principal image on the screen 33a, the coordinate position detecting circuit 93 receives a position signal from the light pen 94 and a synchronizing signal from the read controller 86 to provide a coordinate signal indicating the coordinate of the indicated position on the screen 33a, which in turn is sent to the operation unit 65.

A principal image of an image displayed on the screen 33a can be specified by tracing its outline. Otherwise, the principal image may be specified by pointing to a part of the principal image. In this case, a principal image area is tentatively determined or defined as an aggregate of the picture elements which have three color densities or color identical or similar to those of a point indicated by the light pen 94. In this respect, a closed area surrounded by picture elements having three color densities or color identical or similar to those of a point pointed to by the light pen 94 is determined to be a principal image.

The standard reference images 200-203 and images 45 of twelve picture frames are displayed on the screen 33a in the same manner as described as in the previous embodiments. Each image 45 is compared with the respective standard reference images 200-203 and evaluated or inspected to determine whether it is favorable to print. If there is an image, for example the image 45a which is unfavorable to print, the picture specifying key 57 is operated to specify the image 45a.

Upon specification of the image 45a, image data of four images stored in the memory areas A6, A7, A10, and A11 of the image memory 120 are read out and written in the ROM 90 through the interface 141. Thereafter, image data of the specified image 45a stored in the memory area A1 is read out and sent to the image circuit 142. The image magnifying circuit 142 electrically interpolates the image data of the specified image 45a to magnify the specified image so that it is four times as large as the image originally displayed on the screen 33a. The interpolated image data is written in the centrally located four memory areas A6, A7, A10, and A11 of the image memory 120. Before writing in the interpolated image data, the image memory is changed to the writing mode.

Figure 17:
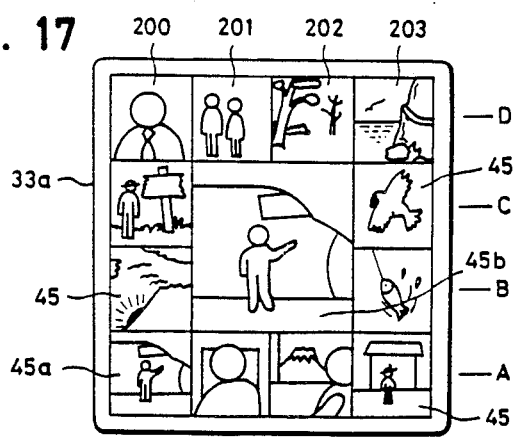
FIGS. 17 to 19 are illustrations of a screen of a color monitor showing various embodiments in which a specified image is magnified.

For transforming the gradation of the magnified image, the table data used for transforming the gradation of the specified image 45a originally displayed is written in four look-up table memories connected to the memory areas A6, A7, A10, and A11 of the image memory 120. The table data is provided by reading out the exposure of the specified image 45a from the memory 157 in the manner as described above. Then, the image data is read out from the memory areas A6, A7, A10 and A11 of the image memory 120 to display a magnified image 45b at the center of the screen 33a as shown in FIG. 17.

If the magnified image 45b includes a principal subject image, such as a human face, the principal image is traced with the light pen 94. As a result, data representing whether each point of the specified image 45a measured with the scanner 58 is within the principal subject image or not is provided and written in the principal image area table section (IAT) 154. The principal image characteristic value drawing section (ICVD) 153 reads out the three color density signals of points which are of the specified principal image from the memory 151 with reference to the data in the principal image area table section (IAT) 154, and thereby computes color image characteristic values, for example mean densities, for the specified principal image for the respective colors.

The exposure operating section 155 selects one of the exposure calculation formulas for the image whose principal image is specified. By substituting the mean density. LATD value, densities of particularly specified points of the specified image 45a, etc, into the selected formula, exposures can be calculated for each color. The exposure thus calculated for each color is sent to the subtracting section 160 to set new color or density correction steps based on the exposures which are stored in the memory 163. As was described previously, the calculated exposures for the respective colors are stored in the memory 157 and table data are newly provided for the respective colors. The three table data are written in the look-up table memories connected to the memory areas A1, A6, A7, A10 and A11 of the image memory 120, respectively. Thus, the specified image 45a and its magnified image 45b, and in particular their principal subject images, are corrected in color and/or density.

If the correction key 37 is operated because the specified image has no principal subject image, data of a correction step number is sent to the corrective exposure operating section 156 and the step correction section 162. When the density key 36 is operated, the corrective exposure operating section 156 increasingly or decreasingly stepwise corrects the exposures for the three colors read out from the memory 157 corresponding to the number of steps of the operated density key. The corrected exposure for each color is sent to the shifter 158 to provide new table data which is then written in the above noted, five table memories, respectively, thus correcting the density of the color images 45a and 45b. The step correction section 162 adds or subtracts the correction steps from the memory 63 and the correction steps from the correction key 37 to provide correction data which in turn is stored in the memory 99. When a color key 35 is operated, exposure of a color corresponding to color key is corrected, and the specified image 45a and the magnified image 45b are correcteq for that color. The resultant correction step is stored as correction data in a memory 163. If the correction for color and/or density is insufficient, the color key 35 and/or the density key 36 may be operated again. For the other images, the same inspection procedures as described with regard to the image 45a are repeated.

Figure 18:
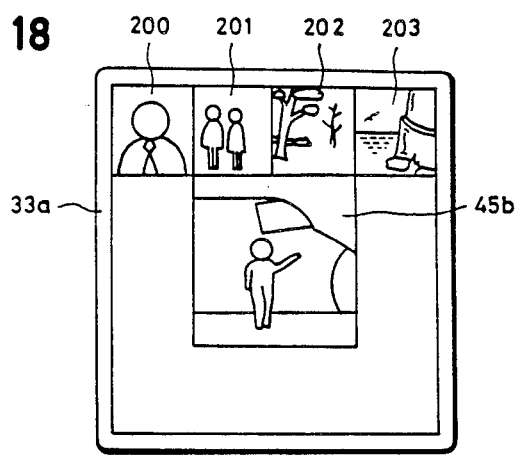

As is shown in FIG. 18, elimination of images which are not specified from the screen 33a is preferred, while the standard reference images 200–203 and the specified and magnified images 45b are displayed. In this case, the RAM 90 should have a memory capacity sufficient to store image data for twelve picture frames transferred thereto upon specifying an image.

Figure 19:
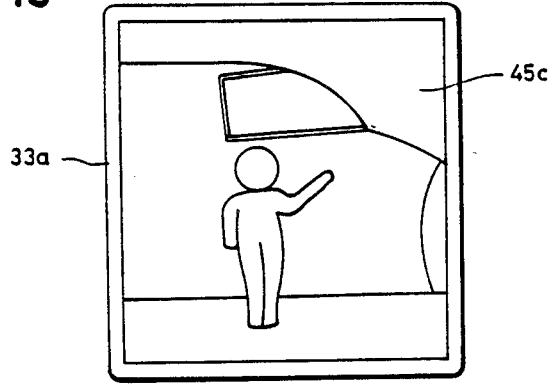

As is shown in FIG. 19, it also may be preferable to eliminate all images including the standard reference images 200–203 while displaying a magnified image 45c which is magnified approximately sixteen times as large as the originally displayed image 45a. In this case, only the magnified, large image 45c is displayed on the screen 90, making it quite easy to inspect the specified image.

Although the present invention has been fully described by way of the preferred embodiments thereof with reference to the accompanying drawings, it is to be noted that various changes and modifications are apparent to those skilled in the art. Therefore, unless such changes and modifications depart from the scope of the present invention, they should be construed as included therein.

What is claimed is:

1. A video-type color film analyzer comprising:
  image pick-up means for picking up images of a plurality of picture frames from a color film;
  video image display means for displaying simulated print images of said simulated images in a matrix pattern and a plurality of reference images in one of a column and a line of said matrix pattern, wherein said video image display means comprises memory means having a plurality of memory blocks corresponding to one of said column and line of said matrix pattern for storing image data of said color images to be displayed, wherein said memory means comprises one memory block for said reference images and a plurality of memory blocks for said plurality of images picked up by said image pick-up means, and wherein said reference images are recorded in a magnetic floppy disk and transferred to said memory block of said memory means from said magnetic floppy disk;
  image specifying means for specifying an entire one of said color images to be corrected for at least one of color and density; and
  shift means for shifting one of said column and line of color images which includes said specified entire one of said color images so that said specified entire one of said color images is adjacent to said one of said column and line where said reference color images is disposed.

2. A video-type color film analyzer as defined in claims 1, wherein said image pick-up means is a color TV camera.

3. A video-type color film analyzer comprising:

image pick-up means for picking up images of a plurality of picture frames from a color film;
video image display means for displaying simulated print images of said images in a matrix pattern and a plurality of reference images in one of a column and a line of said matrix pattern;
means for specifiying one of said color images as being an image whose picture frame need not be printed; and
means for displaying an indication mark overlapping part of said specified color image, said mark indicating that said image need not be printed.

4. A video-type color film analyzer as defined in claim 3, wherein said indication mark is a negative image of said part of said specified color image.

5. A video-type color film analyzer as defined in claim 3, further comprising:
means for transforming gradation of said images to be displayed on said video image display device to simulate their printed images;
means for indicating a number of prints to be made from one of said picture frames having said specified image; and
means for displaying said number of prints in a portion of said specified image displayed on said video image display device.

6. A video-type color film analyzer as defined in claim 5, further comprising:
means for indicating a position of a principal image of said displaying image on said video image display device; and
means for correcting exposures based on characteristic values of said principal image.

7. A video-type color film analyzer as defined in claim 6, further comprising:
means for magnifying said specified image.

8. A video-type color film analyzer as defined in claim 6, further comprising:
means for magnifying entire one of said specified image and terminating display of remaining ones of said images not specified.

9. A video-type color film analyzer as defined in claim 8, wherein said images which are not specified are stored while said entire one of said specified image is magnified.

10. A video-type color film analyzer for displaying simulated color images of a plurality of picture frames from a color film consisting of a plurality of films spliced to one another, said simulated color images being displayed in a matrix pattern on a video image display device, said analyzer comprising:
a color TV camera for providing color image data of said plurality of picture frames;
memory means for storing said color image data;
means for reading out said color image data from said memory means to simulate and display color print images of said picture frames;
means for detecting a spliced section between two of said plurality of films which are spliced to each other and displaying said detected spliced section as a spliced section image on said image displaying device;
means for specifying, one at a time, said images including said spliced section image displayed on said video image display device; and
data inputting means for inputting a number of prints to be produced for a picture frame of said specified image.

11. A video-type color film analyzer as defined in claim 10, wherein said data inputting means inputs a number of prints to be commonly produced for all said picture frames of one of said plurality of films which follows said spliced section, when said spliced section image is specified.

12. A video-type color film analyzer as defined in claim 10, further comprising:
means for displaying said number of prints inputted through said data inputting means in a portion of said specified image.

13. A video-type color film analyzer as defined in claim 11, wherein said memory means stores said number of prints which have been inputted individually for each of said specified images instead of storing said common number of prints if said individual number of prints is specified.

14. A video-type color film analyzer as defined in claim 13, wherein said spliced section is displayed as a blank.

15. A video-type color film analyzer as defined in claim 12 or 13, wherein said spliced section is displayed as a colored blank.

16. A video-type color film analyzer for displaying simulated color print images of a plurality of picture frames of a color film and a plurality of reference color images in a matrix pattern on a video image display device, said analyzer comprising:
a color TV camera for providing color image data of said plurality of picture frames;
memory means for storing said color image data; and
means for processing said color image data read out from said memory means for simulation of color print image of each said picture frame;
said memory means being divided into memory blocks corresponding to one of a column and a line of said matrix pattern, one of said memory blocks being allocated for storing color image data of said plurality of reference color images, and the remaining memory blocks being allocated for storing said color image data of said plurality of picture frames provided by said color TV camera, wherein said reference color images displayed in one of a column and a line of said matrix pattern are different scenes comprising properly exposed color image data.

17. A video-type color film analyzer for displaying simulated color print images of a plurality of picture frames of a color film and a plurality of reference color images in a matrix pattern on a video image display device, said analyzer comprising:
a color TV camera for providing color image data of said plurality of picture frames;
memory means for storing said color image data;
means for processing said color image data read out from said memory means for simulation of color print image of each said picture frame; and
image specifying means for specifiying an entire one of said color images to be corrected for at least one of color and density,
wherein one of the columns and lines of said color image matrix in which said specified entire one of said color images is disposed, is shifted to be adjacent to one of the columns and lines of said reference color images.

18. A video-type color film analyzer for displaying simulated color print images of a plurality of picture frames of a color film in a matrix pattern on a video image display device, said analyzer comprising:
- image specifying means for specifying one of said color images which need not be printed; and
- means for displaying an indication mark which overlaps part of said specified color image, said mark indicating that said specified print is not to be printed.

19. A video-type color film analyzer for displaying images, of a plurality of picture frames of a color film, in a matrix pattern on a video images display device, said analyzer comprising:
- means for specifying one of said displayed images to input a number of prints for said specified image; and
- means for displaying a portion of said inputted number of prints in said specified image.

20. A video-type color film analyzer for providing image signals for color images of a plurality of picture frames of a color film which consists of a plurality of films spliced to one another, and displaying said image signals as color positive images in a matrix on a video image display device, said analyzer comprising:
- means for detecting a spliced section between two of said plurality of films spliced to each other, to display said detected spliced section as a spliced section image in said matrix on said image displaying device;
- means for specifying one of said images including said spliced section image displayed on said video image display device; and
- means for displaying a number of prints for a picture frame corresponding to said specified image, overlapping part of said specified image.

21. A video-type color film analyzer for providing image signals for color images of a plurality of picture frames of a color film, which consists of a plurality of films spliced to one another, and displaying said image signals as color positive images in a matrix on a video image display device, a spliced section between two of said plurality of films spliced to each other being displayed as a spliced section image in said matrix on said image displaying device, said analyzer comprising:
- means for specifying one of said images including said spliced section image displayed on said video image display device;
- means for inputting one of a number of prints common to all picture frames of one of said plurality of films which follows said spliced section when said spliced section image is specified and a number of prints individual to each of said images when each of said images is individually specified;
- means for displaying said number of prints of said specified image overlapping part of said specified image; and
- memory means for storing data for said number of prints inputted individually to each said specified image instead of said common number of prints, when said individual number of prints is inputted.

22. A video-type color film analyzer for displaying color images of a plurality of picture frames of a color film in a matrix on a video image display device, color image signals of each said picture frame being provided by a color TV camera and being gradation transformed according to its exposed condition to simulate printed color images of said displayed color images, said analyzer comprising:
- means for specifying one of said color images displayed on said video image display device; and
- means for magnifying an entire one of said specified color image on said video image display device.

23. A video-type color film analyzer for displaying color images as defined in claim 22, wherein said means for magnifying also terminates the display of the remaining images.

24. A video-type color film analyzer as defined in claim 23, wherein said remaining images are stored while said entire one of said specified color image is magnified.

25. A video-type color film analyzer for providing image data of color images of a plurality of picture frames of a color film consisting of a plurality of films spliced to one another and displaying said image signals stored in a memory as color positive images in a matrix on a video image display device, said analyzer comprising:
- sensor for detecting a spliced section between each two of said plurality of spliced films to provide a signal; and
- means for providing image data of said spliced section when said signal is generated, and writing said image data in said memory, so as to display an image of said spliced section on said video image display device.

26. A method of analyzing a color film, comprising the steps of:
- displaying images of a plurality of picture in a matrix pattern on an image display device;
- specifying one of said color images of said plurality off picture frames; and
- displaying a cursor overlapping a part of said specified image, said cursor having a color different from a color of said part of said specified image, wherein said cursor has a color which is changed from an identical positive color of said part to a negative of said part.

27. A method as defined in claim 26, further comprising the steps of:
- determining when image data of said cursor is similar to image data of said specified color image;
- changing said color of said cursor by performing one of increasing and decreasing said color of said cursor relative to said image data of said specified color image.

28. A method of analyzing a color film having a plurality of films spliced to one another, comprising the steps of:
- providing color image data of a plurality of picture frames of said color film by means of a color TV camera;
- storing said color image data in memory means;
- reading out said color image data from said memory means to simulate and display color print images of said picture frames in a matrix pattern on an image display device;
- detecting a spliced section between each two of said plurality of films spliced to each other to display said detected spliced section as a spliced section image on said image display device;
- specifiying one of said images including said spliced section image displayed on said video image display device; and
- inputting data for a number of prints to be made of a picture frame having said specified image.

29. A method of analyzing a color film consisting of a plurality of films spliced to one another, comprising the steps of:
  providing color image data of a plurality of picture frames of said film by means of a color TV camera;
  storing said color image data in memory means which is divided into memory blocks, one of said memory blocks storing color image data of a plurality of reference color images and the remaining memory blocks storing said color image data of said plurality of picture frames provided by said color TV camera; and
  processing said color image data read out from said memory means to display said color images including said reference images in a matrix pattern on an image display device for simulation of a color print image of each said picture frame, wherein said reference color images displayed in one of a column or a line of said matrix pattern are different scenes comprising properly exposed color image data.

30. A method of analyzing a color film consisting of a plurality of films spliced to one another, comprising the steps of:
  providing color image data of a plurality of picture frames of said film by means of a color TV camera;
  storing said color image data in memory means;
  processing said color image data read out from said memory means and displaying said images in a matrix on an image displaying device for simulation of color print image of each said picture frame; and
  specifying an entire one of said color images to be corrected by one of color and density to shift one of a column and a line of said color image matrix in which said entire one of a specified image is disposed so that said specified image is adjacent to one of a column and a line of reference color images.

31. A method of analyzing a color film consisting of a plurality of films spliced to one another, comprising the steps of:
  providing color image data for a plurality of picture frames of said film by means of a color TV camera;
  storing said color image data in memory means;
  displaying said image data as simulated images in a matrix on an image displaying device;
  specifiying one of said color images as not necessary to be printed; and
  displaying an indication mark overlapping a part of said specified color image, said mark indicating that no print is to be printed.

32. A method of analyzing a color film consisting of a plurality of films spliced to one another comprising the steps of:
  providing image data of a plurality of picture frames of said color film to display said image data as color images in a matrix on a video image display device;
  detecting a spliced section between each of two of said plurality of films spliced to each other to display said detected spliced section as a spliced section image in said matrix on said image display device;
  specifying one of said images including said spliced section image displayed on said video image display device; and
  displaying a number of prints of a picture frame having said specified image overlapping a part of said specified image.

33. A method of analyzing a color film as defined in claim 32, further comprising the steps of:
  inputting a number of prints common to all picture frames of one of said plurality of films which follows said spliced section when one of said spliced section image is specified and inputting a number of prints individual to each of said images when each of said images is individually specified; and
  storing said number of prints inputted individually for each said specified image in a memory means instead of said common number of prints when said individual number of prints is inputted.

34. A method of analyzing a color film consisting of a plurality of films spliced to one another comprising the steps of:
  providing image data of a plurality of picture frames of said color film;
  displaying said image data as color images in a matrix on a video image display device;
  specifying one of said color images displayed on said video image display device; and
  magnifying an entire one of said specified color image on said video image display device while eliminating the remaining images.

35. A method as defined in claim 34, further comprising the step of:
  storing said remaining images while said entire one of said specified color image is magnified.

* * * * *